(12) United States Patent
Makinen et al.

(10) Patent No.: US 11,888,412 B2
(45) Date of Patent: Jan. 30, 2024

(54) STACKABLE ACTUATING ELEMENT WITH PROFILED INSULATED ELECTRODE STRUCTURES

(71) Applicant: PixArt Imaging Inc., Hsin-Chu (TW)

(72) Inventors: Ville Topias Makinen, Espoo (FI); Roberto Tejera-Garcia, Espoo (FI)

(73) Assignee: PixArt Imaging Inc., Hsin-Chu (TW)

( * ) Notice: Subject to any disclaimer, the term of this patent is extended or adjusted under 35 U.S.C. 154(b) by 250 days.

(21) Appl. No.: 17/377,403

(22) Filed: Jul. 16, 2021

(65) Prior Publication Data

US 2021/0344284 A1 Nov. 4, 2021

Related U.S. Application Data

(63) Continuation-in-part of application No. 15/852,386, filed on Dec. 22, 2017, now Pat. No. 11,101,745.

(30) Foreign Application Priority Data

Jul. 14, 2017 (FI) ..................................... 20175691

(51) Int. Cl.
  *H02N 1/00* (2006.01)
(52) U.S. Cl.
  CPC .................................. *H02N 1/006* (2013.01)
(58) Field of Classification Search
  CPC . H02N 1/006; H02N 1/00; B81B 3/00; B81B 3/0037; B81B 2203/051; H04R 19/00; H04R 31/00; G06F 3/016; G06F 1/1686; G06F 1/1694; G06F 3/0202; G01P 15/0802; G01P 15/097; G01P 15/125; H01H 59/0009; H01H 2003/008; H03K 17/98; H03K 2217/96062
(Continued)

(56) References Cited

U.S. PATENT DOCUMENTS 9,490,306 B2  11/2016  Kim
9,595,892 B2  3/2017   Takahashi
(Continued)

FOREIGN PATENT DOCUMENTS

JP         6-284750 A      10/1994
KR  10-2015-0112793 A      10/2015
WO      2018/172621 A2      9/2018

OTHER PUBLICATIONS

WO 2021092753; Hu et al. (Year: 2021).*
WO 2018172622; Makinen et al. (Year: 2018).*

*Primary Examiner* — Ahmed Elnakib
(74) *Attorney, Agent, or Firm* — Winston Hsu

(57) ABSTRACT

An active element (AE) layer includes: a substrate including an active body area and a protruding arm; an electrode, formed on the substrate and including an active region for sensing or actuation formed on the active body area of the substrate and a connection region formed on the protruding arm of the substrate, wherein the electrode includes a first indented line around the periphery of the active region, extending into the connection region and reaching two respective edges of the connection region, wherein the first indented line totally penetrates the electrode to make the respective edges electrically isolated; and an insulator layer formed on the electrode covering the active region and partially covering the connection region, wherein the insulator layer fills the indented line of the electrode.

6 Claims, 23 Drawing Sheets

(58) Field of Classification Search
USPC .......................................................... 310/309
See application file for complete search history.

(56) References Cited

U.S. PATENT DOCUMENTS

| | | |
|---|---|---|
| 9,667,173 B1 | 5/2017 | Kappus |
| 2006/0102461 A1 | 5/2006 | Cok |
| 2006/0105152 A1 | 5/2006 | Cok |
| 2006/0170925 A1 | 8/2006 | Lin |
| 2012/0268386 A1 | 10/2012 | Karamath |
| 2013/0249859 A1* | 9/2013 | Park .................. G06F 3/016 |
| | | 345/174 |
| 2014/0210313 A1 | 7/2014 | Kim |
| 2014/0338458 A1 | 11/2014 | Wang |
| 2016/0091971 A1 | 3/2016 | Burr |
| 2017/0010129 A1* | 1/2017 | Wyrobek ................ G01L 1/148 |
| 2019/0020288 A1 | 1/2019 | Mäkinen |
| 2022/0107696 A1* | 4/2022 | Park .................. G06F 3/0412 |
| 2022/0181994 A1 | 6/2022 | Makinen |
| 2022/0368248 A1* | 11/2022 | Saneyoshi .............. H02N 1/002 |

* cited by examiner

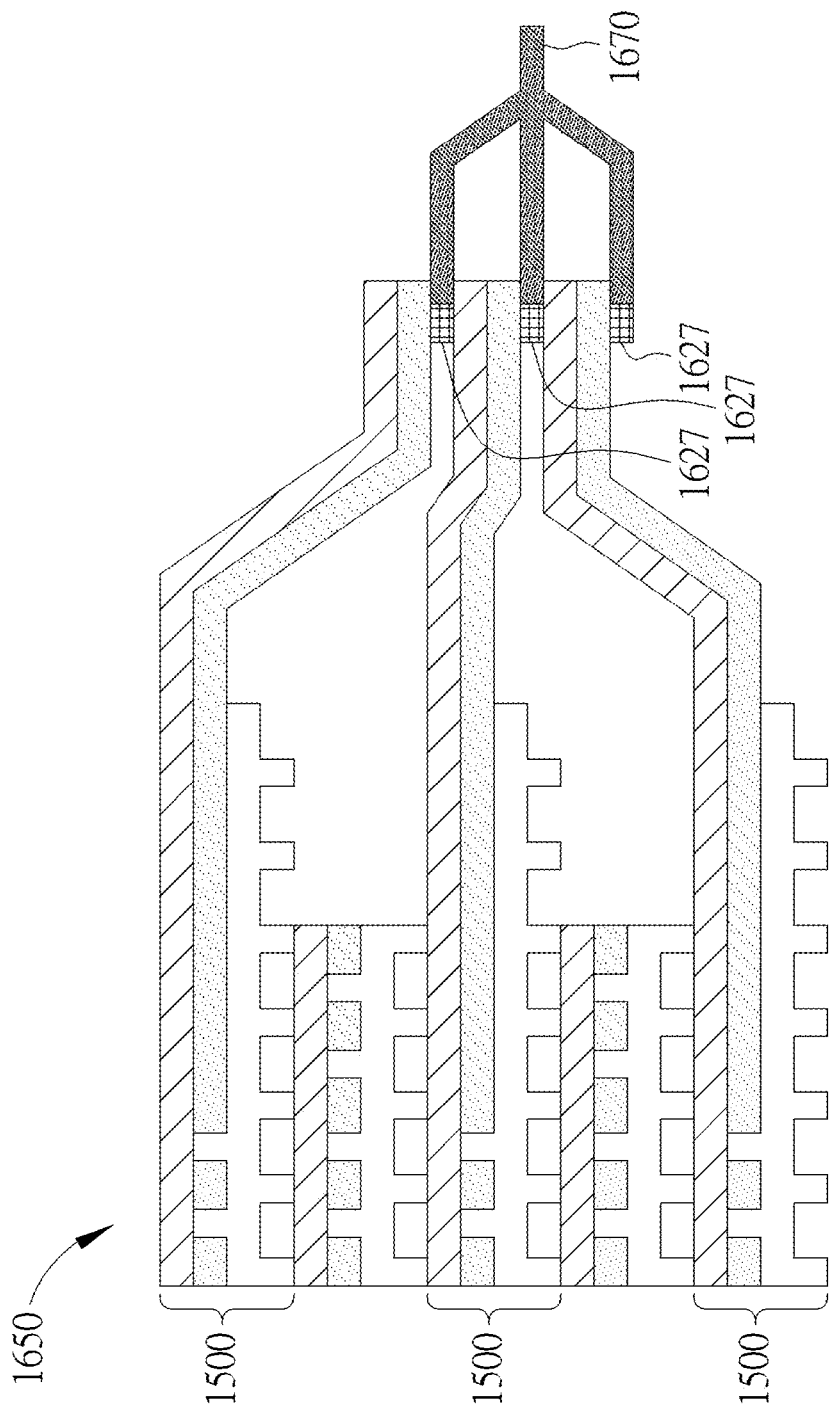

STACKABLE ACTUATING ELEMENT WITH PROFILED INSULATED ELECTRODE STRUCTURES

CROSS REFERENCE TO RELATED APPLICATIONS

This application is a Continuation in Part of U.S. patent application Ser. No. 15/852,386, which was filed on Dec. 22, 2017, the contents of which are included herein by reference.

BACKGROUND OF THE INVENTION

1. Field of the Invention

This invention is directed to a method for providing electrical edge insulation for an elastomeric film actuator used in an actuator or a sensor, and further directed to a stacked actuator or sensor structure which uses book binding edges and adhesive connections between the layers to prevent lateral displacement and improve electrical connections between the layers. The invention further includes favorable encasing methods and methods facilitating cost effective manufacturing.

2. Description of the Prior Art

There are various techniques for facilitating electrically induced mechanical movement in devices (e.g., consumer electronic devices). One common technique is the use of an Eccentric Rotating Mass (ERM) vibration motor. An ERM vibration motor moves a small rotating mass that is off-center from the point of rotation. The rotation of the mass produces a centripetal force, thereby causing the entire motor to move and vibrate from side to side. Another common technique for facilitating electrically induced mechanical movement is the use of a linear resonant actuator (LRA). An LRA uses magnetic fields and electrical current to create a force on a coil, with the coil driving a magnetic mass up and down against a spring. The movement of the magnetic mass inside a housing moves the entire LRA, thus producing electrically induced mechanical movement. Another common technique is the use of a piezoelectric actuator. A piezoelectric actuator produces a mechanical change (e.g., deformation) in a piezoelectric material in response to an applied electric charge, and the mechanical change produces electrically induced mechanical movement.

These techniques for electrically induced mechanical movement are often characterized by high power consumption; low durability; short lifespan; complex design with external motors, masses, or both; low scalability, especially on flexible surfaces; poor suitability to large area actuation; or any combination thereof.

SUMMARY OF THE INVENTION

This in mind, it is an objective of the present invention to provide a number of stacked structures which have good rigidity and can achieve electrical isolation to prevent sparks between the layers.

In a first aspect of the invention, an active element (AE) layer is provided comprising: a substrate comprising a flat main body and a protruding arm; an electrode, formed on the substrate and comprising an active region for sensing formed on the flat main body of the substrate and a connection region formed on the protruding arm of the substrate, wherein the electrode comprises a first indented line around the periphery of the active region, extending into the connection region and reaching two respective edges of the connection region, wherein the first indented line totally penetrates the electrode; and an insulator layer formed on the electrode covering the active region and partially covering the connection region, wherein the insulator layer fills the indented line of the electrode. The AE layer further comprises a second indented line formed within the first indented line and formed around the periphery of the active region, extending into the connection region and reaching the two respective edges of the connection region beyond the first indented line, wherein the second indented line totally penetrates the electrode. At least one of the first indented line and the second indented line partially penetrates the substrate.

A plurality of these FAE layers can be stacked to form a sensor or actuator. Another aspect of the invention provides a number of stacked structures formed of a plurality of FAE layers as disclosed above, the plurality being at least two.

A stacked structure formed of at least two flat active element (FAE) layers comprises: a first substrate; a first conductive surface formed on the first substrate and comprising an active region and a connecting region; a second substrate; a second conductive surface totally formed on the second substrate and comprising an active region and a connecting region; a compression space between the first active region of the first conductive surface and the second substrate; an elastic layer formed on the active region of the first conductive surface or on an exposed surface of the second substrate, the elastic layer comprising a plurality of elastic nodules spanning the compression space and contacting the second substrate, the plurality of elastic nodules configured to be compressed by relative movement of the first conductive surface and the second conductive surfaces toward each other in response to a voltage difference between the first conductive surface and the second conductive surfaces or in response to an external force; a conductive adhesive contacting the connecting region of the first conductive surface and the connecting region of the second conductive surface; and a conductive element coupled to the conductive adhesive, for electrically connecting the two FAE layers.

In one embodiment, the first substrate, the first conductive layer, the second substrate and the second conductive layer all have substantially the same dimensions along the connecting region, the connecting region of the first conductive surface is disposed in the same horizontal plane as the active region of the first conductive surface, and the connecting region of the second conductive surface is disposed in the same horizontal plane as the active region of the second conductive surface.

In another embodiment, the conducting region of the first conductive layer is longer than the conducting region of the second conductive layer, the connecting region of the first conductive layer is bent with respect to the active region of the first conductive layer, the connecting region of the second conductive layer is bent with respect to the active region of the second conductive layer, and the connecting region of the first conductive layer and the connecting region of the second conductive layer are bent towards each other.

A stacked structure formed of at least two flat active element (FAE) layers according to another exemplary embodiment comprises: a first substrate; a first conductive surface totally formed on the first substrate and comprising an active region and a connecting region; a second substrate;

a second conductive surface totally formed on the second substrate and comprising an active region and a connecting region; a compression space between the first active region of the first conductive surface and the second substrate; an elastic layer formed on the active region of the first conductive surface or on an exposed surface of the second substrate, the elastic layer comprising a plurality of elastic nodules spanning the compression space and contacting the second substrate, the plurality of elastic nodules configured to be compressed by relative movement of the first conductive surface and the second conductive surfaces toward each other in response to a voltage difference between the first conductive surface and the second conductive surfaces or in response to an external force; a first conductive element coupled to the connecting region of the first conductive surface with a first conductive adhesive layer; and a second conductive element coupled to the connecting region of the second conductive surface with a second conductive adhesive layer. The first conductive element and the second conductive element are coupled together for electrically connecting the two FAE layers.

A stacked structure formed of at least two flat active element (FAE) layers according to another exemplary embodiment comprises: a first substrate; a first conductive surface totally formed on the first substrate and comprising an active region and a connecting region; a second substrate; a second conductive surface totally formed on the second substrate and comprising an active region and a connecting region; a compression space between the first active region of the first conductive surface and the second substrate; an elastic layer formed on the active region of the first conductive surface or on an exposed surface of the second substrate, the elastic layer comprising a plurality of elastic nodules spanning the compression space and contacting the second substrate, the plurality of elastic nodules configured to be compressed by relative movement of the first conductive surface and the second conductive surfaces toward each other in response to a voltage difference between the first conductive surface and the second conductive surfaces or in response to an external force; and a first solid binding edge formed at one side of the active region of the first conductive surface and the second conductive surface, and coupled to the first active region of the first conductive surface and the second substrate with non-conductive adhesive.

The stacked structure further comprises a second solid binding edge formed opposite to the first solid binding edge and coupled to the first active region of the first conductive surface and the second substrate with non-conductive adhesive. The first solid binding edge and the second solid binding edge each comprise a nodule formed in the compression space.

In a stacked structure formed of at least two flat active element (FAE) layers according to another exemplary embodiment, each FAE comprises: a substrate; a conductive surface totally formed on the substrate and comprising an active region and a connecting region; and an elastic layer formed on the active region of the conductive surface or on the exposed surface of the substrate, the elastic layer comprising a plurality of elastic nodules. There is a compression space between each FAE layer, the elastic nodules span the compression space and are configured to be compressed by movement of the conductive surface, the FAE layers comprise a first plurality of FAE layers corresponding to a first plurality and a second plurality of FAE layers corresponding to a second plurality, and the first plurality of FAE layers and the second plurality of FAE layers are arranged alternately, and the stacked structure further comprises: a first solid binding edge formed at one side of the active region of the plurality of FAE layers and comprising a conductive adhesive coupling the first plurality of FAE layers.

The stacked structure further comprises a second solid binding edge formed opposite to the first solid binding edge and comprising a conductive adhesive coupling the second plurality of FAE layers.

In a stacked structure formed of at least two flat active element (FAE) layers according to another exemplary embodiment, each FAE comprises: a substrate; a conductive surface formed on the substrate and comprising an active region and a connecting region; and an elastic layer formed on the active region of the conductive surface or on an exposed surface of the substrate, the elastic layer comprising a plurality of elastic nodules. There is a compression space between each FAE layer, the elastic nodules span the compression space and are configured to be compressed by movement of the conductive surface, the FAE layers comprise a first plurality of FAE layers corresponding to a first plurality and a second plurality of FAE layers corresponding to a second plurality, and the first plurality of FAE layers and the second plurality of FAE layers are arranged alternately. The connecting regions of the plurality of FAE layers are coupled together with an external holding structure to prevent lateral displacement of the FAE layers with respect to each other, wherein the vertical movement of their active regions is not hindered.

The active regions of the plurality of FAE layers are coupled together with a flexible external holding structure to prevent lateral displacement of the FAE layers with respect to each other. The external holding structure comprises a single strip surrounding the active regions of the plurality of FAE layers. Alternatively, the external holding structure comprises a first strip layer and a second strip layer surrounding the active regions of the plurality of FAE layers, wherein the first strip layer is disposed in a different direction forming at least a partially crossing pattern from the second strip layer to prevent lateral movements in different directions.

A solid or elastic structure encases the stacked structure, the solid structure comprising: rigid or elastic walls surrounding the sides of the stacked structure; a solid mounting structure applied to the top layer of the stacked structure, the solid mounting structure having a shape which protrudes over the height of the walls of the encasing structure, and mechanically connected to a structure that is to be sensed or actuated.

A hermetically sealed or semi-sealed pouch further encases the stacked structure, the hermetically sealed or semi-sealed pouch being formed of a flexible material which has a folded shape or loose shape that allows the volume inside the pouch to change, to accommodate change in ambient air pressure without hindering the compressive movement of the actuation or sensing of the stacked structure.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 16C is a diagram of a stacked structure according to a third embodiment of the present invention.

DETAILED DESCRIPTION

Figure 1:
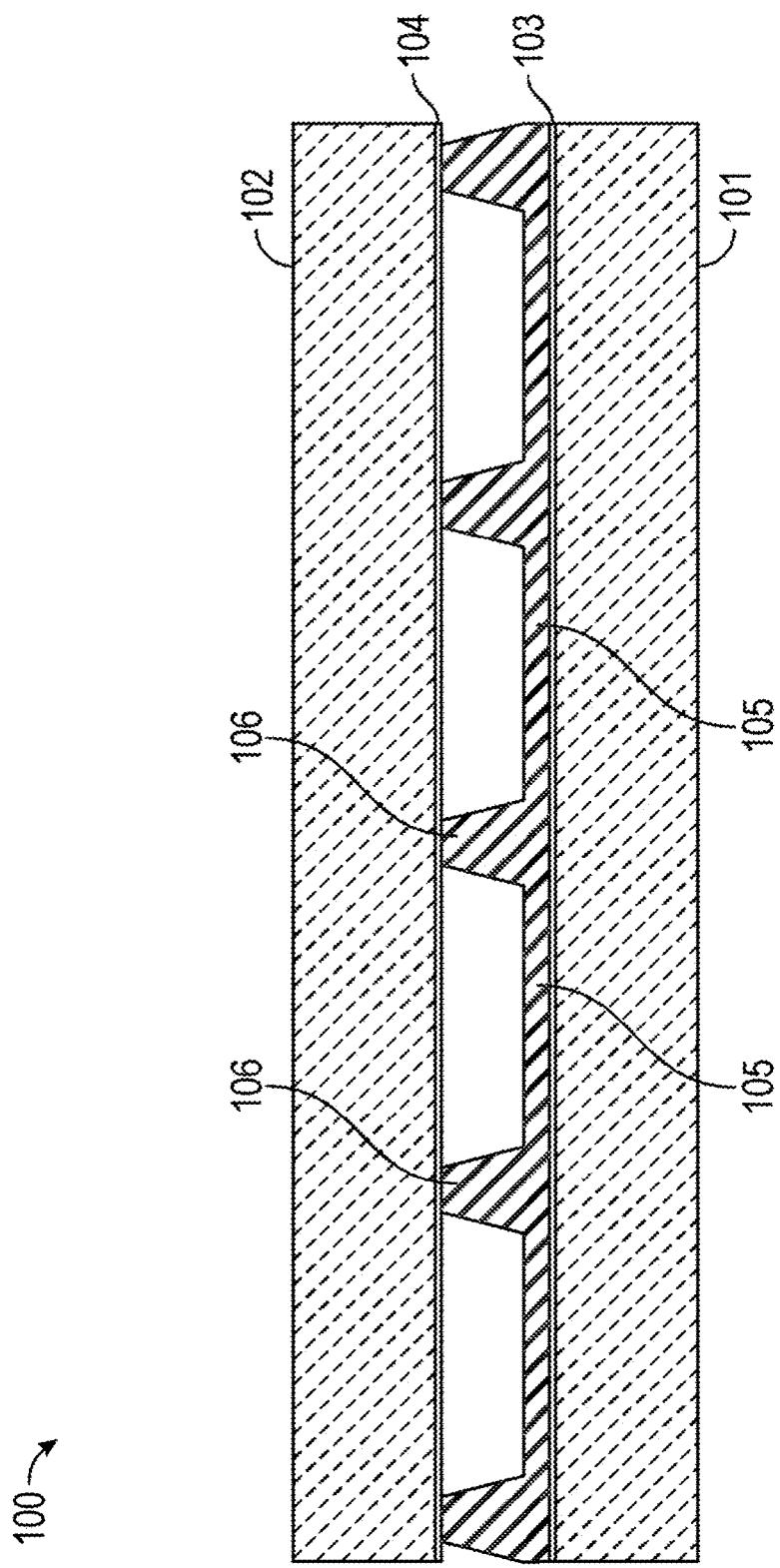
FIG. 1 is a cross-sectional diagram illustrating at least a portion of a single layer of an electrostatic actuator (e.g., an electrostatic actuator structure), according to some example embodiments.

Example structures (e.g. devices, systems, or other apparatus) described herein facilitate electrically induced mechanical movement, which may accordingly provide one or more tactile effects (e.g. tactile feedback). Examples merely typify possible variations. Unless explicitly stated otherwise, structures (e.g. structural components, such as layers or nodules) are optional and may be combined or subdivided, and operations are optional and may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

Various example embodiments of the structures discussed herein may be or include a special electrostatic actuator (e.g. electrostatic actuator structure) or sensor that includes at least a first electrode and a second electrode. The electrostatic actuator may also include one or more electrostatic actuation layers, and at least one of said electrostatic actuation layers includes: a first substrate film, which is intrinsically conductive or semi conductive, or includes a first conductive electrode layer, the first conductive electrode layer being a part of the first electrode, a second substrate film, which is intrinsically conductive or semi conductive, or includes a second conductive electrode layer, the second conductive electrode layer being a part of the second electrode, at least one of the first and second conductive electrode layers being insulated (e.g. electrically) from the respective first and second substrate films, and a grid array that includes a plurality (e.g. multitude) of elastic support nodules, the plurality of elastic support nodules being configured (e.g. arranged) between the first substrate film and the second substrate film, such that there is a compression space between the first and second conductive electrode layers, the compression space being not entirely filled with solid material; and wherein the electrostatic actuator is configured to compress (e.g. by a certain percentage or by a certain distance) in response to a voltage difference between the first and second electrodes (e.g. in response to the voltage difference exceeding or otherwise transgressing a threshold voltage difference, such that the electrostatic actuator compresses by a certain percentage or by certain distance when a sufficient voltage difference is applied between at least the first electrode and the second electrode).

Accordingly, the electrostatic actuator may be or include an actuator that comprises: a first substrate having a first conductive surface (e.g., functioning as a first electrode); a second substrate having a second conductive surface (e.g. functioning as a second electrode), the first and second conductive surfaces facing toward each other across a compression space between the first and second substrates; and a plurality of elastic nodules spanning the compression space and separating the first and second conductive surfaces, the compression space being less than fully filled with solid (e.g. elastic) material, the compression space being configured to compress (e.g. by certain percentage or by a certain distance) in response to a voltage difference between the first conductive surface and the second conductive surface (e.g. in response to the voltage difference exceeding or otherwise transgressing a threshold voltage difference).

FIG. 1 is a cross-sectional diagram illustrating at least a portion of a single electrostatic actuation layer 100 of an electrostatic actuator (e.g., an electrostatic actuator structure), according to some example embodiments. The electrostatic actuation layer 100 illustrated in FIG. 1 includes a first substrate 101 (e.g. a first substrate film) and a second substrate 102 (e.g. a second substrate film). In the example embodiments shown in FIG. 1, the first substrate 101 and the second substrate 102 each may have typically a thickness of 5 to 100 micrometers. The first substrate 101 may include electrically insulating material or be intrinsically conductive or semi conductive, according to various example embodiments. In the example embodiments shown in FIG. 1, the first substrate 101 is a film that includes or otherwise provides a first conductive layer 103 (e.g. a first conductive electrode layer) applied on top of the first substrate 101. The first conductive layer 103 may form all or part of a first electrode. Accordingly, the first substrate 101 can be described as having a first conductive surface, whether the first conductive surface is intrinsically conductive, intrinsically semi conductive, or intrinsically insulative but topped with the first conductive layer 103.

Similarly, as shown in FIG. 1, the second substrate 102 is a film that includes or otherwise provides a second conductive layer 104 (e.g. a second conductive electrode layer) applied on top of the second substrate 102. The second conductive layer 104 may form all or part of a second electrode. Accordingly, the second substrate 102 can be described as having a second conductive surface, whether the second conductive surface is intrinsically conductive, intrinsically semi conductive, or intrinsically insulative but topped with the second conductive layer 104. According to various example embodiments, the first conductive layer 103, the second conductive layer 104, or both, are insulated.

The first substrate 101 (e.g. with the insulated first conductive layer 103) has a layer of electrically insulating elastomer material 105 (e.g. an electrically insulating elastomer coating) applied on top of the insulated first conductive layer 103 of the first substrate 101. Furthermore, there is a group (e.g. plurality or multitude) of elastic support nodules 106 arranged (e.g. in a grid array) and adhered on top of, or forming part of, the intrinsic structure of the layer of electrically insulating elastomer material 105. In the example embodiments shown in FIG. 1, the layer of electrically insulating elastomer material 105 may typically have a thickness of 1 to 30 micrometers. Furthermore, according to certain example embodiments, the elastic support nodules 106 each have a height of 5 to 100 micrometers and a diameter of 10 to 400 micrometers. In addition, according to some example embodiments, the elastic support nodules 106 each have an aspect ratio of height to maximum width, and the aspect ratio may have a maximum value of two.

Figure 2:
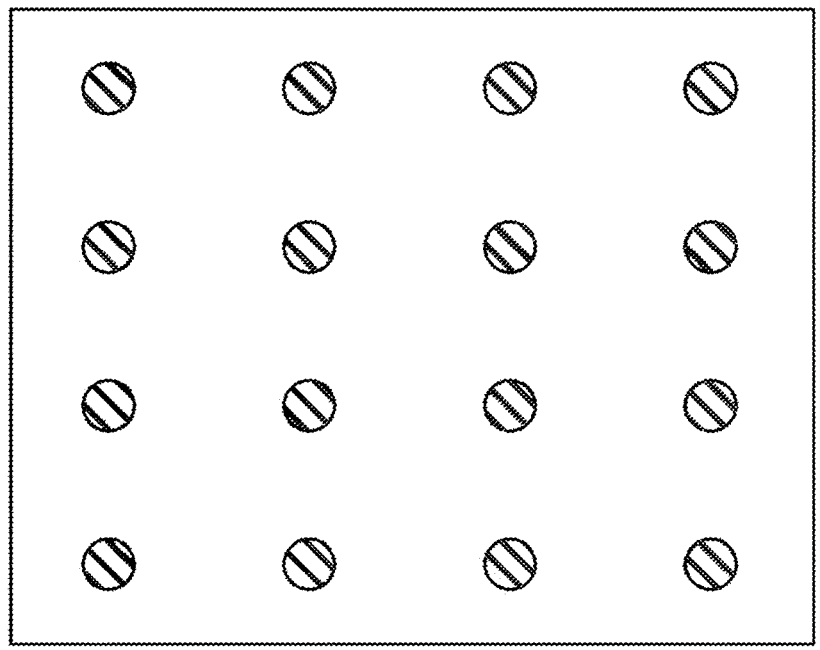
FIG. 2 is a plan view diagram illustrating a multitude of elastic support nodules, arranged in a spaced two-dimensional row-column grid array, according to some example embodiments.
Figure 3:
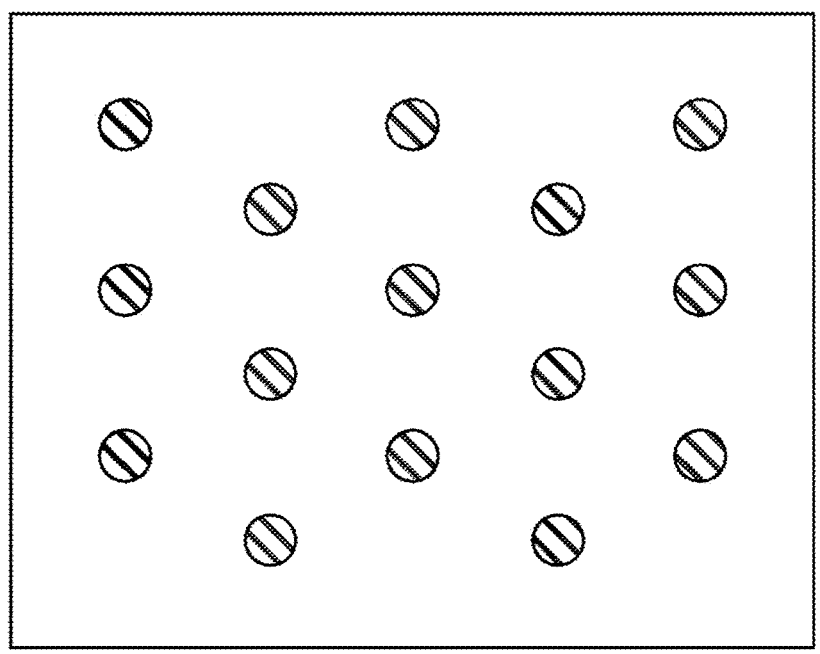
FIG. 3 is a plan view diagram illustrating a multitude of elastic support nodules, arranged in a spaced triangular grid array, according to some example embodiments.

The layer of electrically insulating elastomer material 105, the group of elastic support nodules 106, or both may be applied using a suitable microfabrication technique (e.g. a deposition technique, such as a thin film deposition technique). The group of elastic support nodules 106 may be fully or partially made of a silicon-based organic polymer (e.g. polydimethylsiloxane (PDMS)), rubber (e.g. natural or synthetic), or any suitable combination thereof. Furthermore, the group of elastic support nodules 106 may be arranged less than 5 millimeters apart from each other in distance, and in some example embodiments, the internodule distance is less than 500 micrometers. In certain example embodiments, the group of elastic support nodules 106 is arranged in a grid array, such as a spaced two-dimensional row-column grid array, as illustrated in FIG. 2. In some alternative example embodiments, the group of elastic support nodules 106 is arranged in a spaced triangular grid array, as illustrated in FIG. 3.

After the group of elastic support nodules 106 has been applied to the first substrate 101, the second substrate 102 with the second conductive layer 104 may be turned upside down and placed on top of the group of elastic support nodules 106 to form the electrostatic actuation layer 100 (e.g. a single electrostatic actuation layer that may be combined with one or more additional electrostatic actuation layers into a multi-layer electrostatic actuator structure). Before the second substrate 102 is placed on top of the group of elastic support nodules 106, there may be a layer of adhesive applied to the second substrate 102, to the group of elastic support nodules 106, or to both.

As the first substrate 101 and the second substrate 102 have been stacked one above the other (e.g. to form the electrostatic actuation layer 100), the distance between the first conductive layer 103 and the second conductive layer 104, which may be the distance between the first and second electrodes, in the electrostatic actuation layer 100 may be less than 1000 micrometers and, in some example embodiments, less than 200 micrometers. In the electrostatic actuation layer 100 shown in FIG. 1, the distance between the first and second conductive layers 103 and 104 may be 80 micrometers.

In the electrostatic actuation layer 100, the group of elastic support nodules 106 provides a compression space between the first and second conductive layers 103 and 104. In many example embodiments, the compression space is not entirely filled with solid material (e.g. the compression space is less than fully filled with solid material, such as solid elastic material). In the example embodiments shown in FIG. 1, the compression space may be 80 micrometers thick, and the layer of electrically insulating elastomer material 105 may be 20 micrometers thick, thus leaving a space gap of 60 micrometers. This space gap in the compression space may be filled with fluid (e.g. air, nitrogen, or a dielectric liquid, such as dielectric hydraulic fluid) in places where the elastic support nodules 106 are not present.

In the example embodiments shown in FIG. 1, the electrostatic actuation layer 100 (e.g. one of multiple electrostatic actuation layers within the electrostatic actuator) may also include a group of limiting nodules, which may be arranged in a grid array (e.g. similar to the row-column grid array illustrated in FIG. 2 or the triangular grid array illustrated in FIG. 3). This group of limiting nodules may be arranged between or among the elastic support nodules 106 and between the first substrate 101 and the second substrate 102, for limiting the compression of the compression space and thereby limiting the compression of the electrostatic actuation layer 100 overall. In the example embodiments shown in FIG. 1, the conductive surfaces of the first and second conductive layers 103 and 104 on both sides of the space gap, the elastic support nodules 106, or both may be inherently hydrophobic, hydrophobically or superhydrophobically coated, hydrophobically or superhydrophobically treated, or any suitable combination thereof.

The electrostatic actuation layer 100 is configured (e.g. arranged) to compress when a sufficient voltage difference is applied between at least the first conductive layer 103 (e.g. functioning as a first electrode) and the second conductive layer 104 (e.g. functioning as a second electrode). Hence, an electrostatic actuator (e.g. an electrostatic actuator structure) that includes one or more electrostatic actuation layers (e.g. electrostatic actuation layer 100) may be configured to compress in response to such a voltage difference between the first conductive layer 103 and the second conductive layer 104 (e.g. between respectively first and second conductive surfaces thereof) exceeding a threshold voltage difference (e.g. a predetermined threshold voltage difference). Accordingly, an electrostatic actuator that includes one or more of such electrostatic actuation layers may be configured to be compressed in response to application of such a voltage difference. According to various example embodiments, the electrostatic actuator may be included (e.g. embedded) as part of a flexible or elastic substrate. For example, the electrostatic actuator itself may be intrinsically flexible, elastic, or both, and may be included in such a flexible or elastic substrate. The electrostatic actuation layer 100 shown in FIG. 1 may have an overall thickness in the range of approximately 15 micrometers to approximately 500 micrometers, including the thickness of the first and second conductive layers 103 and 104 and, in some example embodiments, the thickness of an adhesive layer between the elastic support nodules 106 and the second conductive layer 104.

Figure 4:
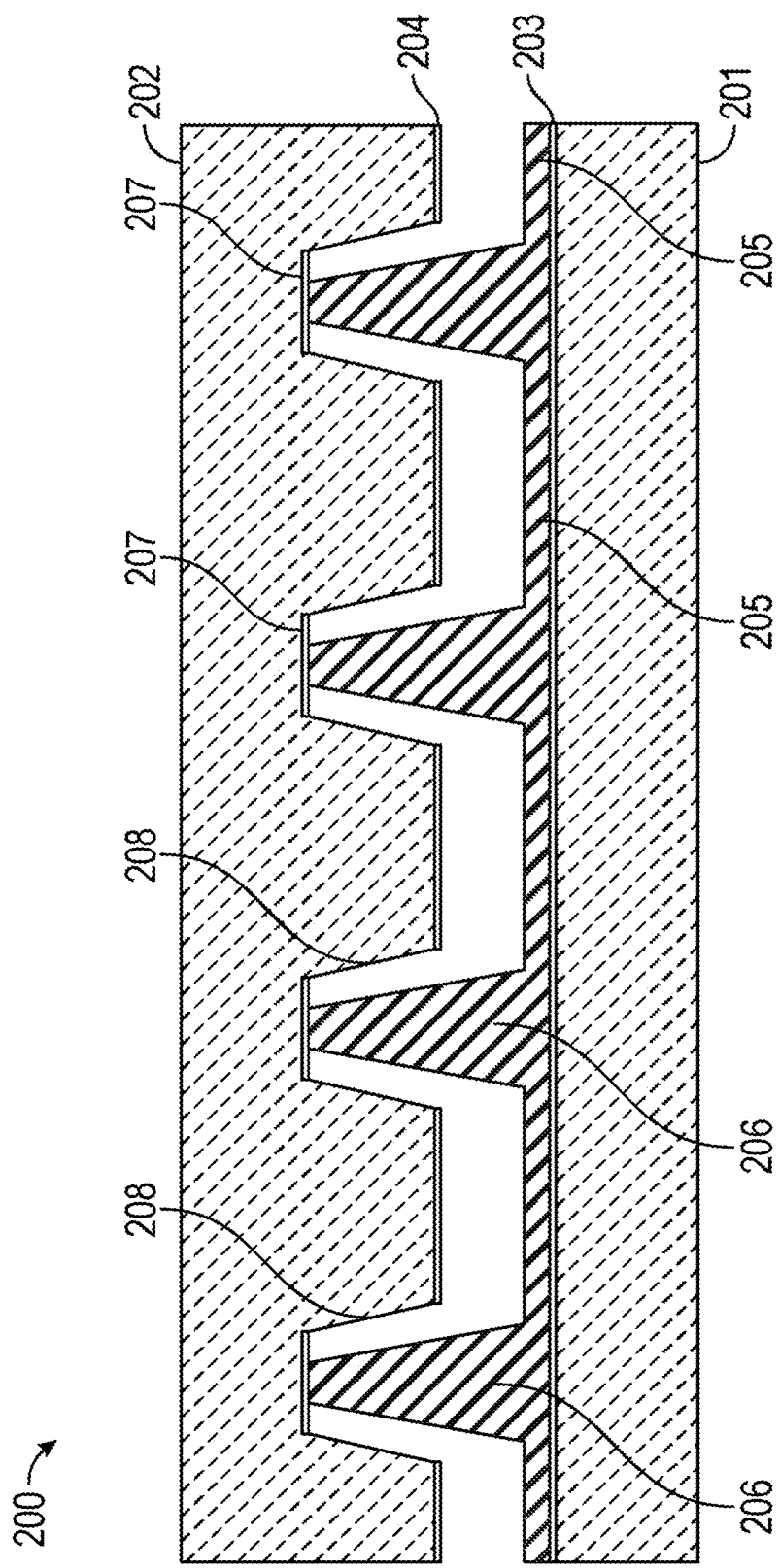
FIG. 4 is a cross-sectional diagram illustrating at least a portion of a single layer of an electrostatic actuator, according to some example embodiments.

FIG. 4 is a cross-sectional diagram illustrating at least a portion of a single electrostatic actuation layer 200 of an electrostatic actuator (e.g., an electrostatic actuator structure), according to some example embodiments. The electrostatic actuation layer 200 illustrated in FIG. 4 includes a first substrate 201 (e.g. a first substrate film) and a second substrate 202 (e.g. a second substrate film). In the example embodiments shown in FIG. 4, the first substrate 201 may have a thickness of 20 micrometers, and the second substrate 202 may have a thickness of 50 micrometers. The first substrate 201 may be a film that includes or otherwise provides a first conductive layer 203 (e.g. a first conductive electrode layer) applied on top of the first substrate 201. The first conductive layer 203 may form all or part of a first electrode. The second substrate 202 may be a film that includes or otherwise provides a second conductive layer 204 (e.g. a second conductive electrode layer) applied on top of the second substrate 202. The second conductive layer 204 may form all or part of a second electrode. According to various example embodiments, the first conductive layer 203, the second conductive layer 204, or both, are insulated.

The first substrate 201 (e.g. with the insulated first conductive layer 203) has a layer of electrically insulating elastomer material 205 (e.g. an electrically insulating elastomer coating) applied on top of the insulated first conductive layer 203 of the first substrate 201. Furthermore, there is a group (e.g. plurality or multitude) of elastic support nodules 206 arranged (e.g. in a grid array) and adhered on top of, or forming part of, the intrinsic structure of the layer of electrically insulating elastomer material 205. In the example embodiments shown in FIG. 4, the layer of electrically insulating elastomer material 205 may have a thickness of 20 micrometers. Furthermore, according to certain example embodiments, the elastic support nodules 206 each have a height of 80 micrometers. In addition, according to some example embodiments, the elastic support nodules 206 each have an aspect ratio of height to maximum width, and the aspect ratio may have a maximum value of two.

The layer of electrically insulating elastomer material 205, the group of elastic support nodules 206, or both may be applied using a suitable microfabrication technique (e.g. a thin film deposition technique). The group of elastic support nodules 206 may be fully or partially made of a silicon-based organic polymer (e.g. PDMS), rubber (e.g. natural or synthetic), or any suitable combination thereof. Furthermore, the group of elastic support nodules 206 may be arranged less than 10 millimeters apart from each other in distance, and in some example embodiments, the internodule distance is less than 2 millimeters. In certain example embodiments, the group of elastic support nodules 206 is arranged in a grid array, such as a spaced two-dimensional row-column grid array, as illustrated in FIG. 2. In some alternative example embodiments, the group of elastic support nodules 206 is arranged in a spaced triangular grid array, as illustrated in FIG. 3.

As shown in FIG. 4, the second substrate 202 may be microfabricated (e.g. etched) to provide wells 208 in the second substrate 202. The wells 208 may be arranged to match the group of elastic support nodules 206 applied to the first substrate 201. The wells 208 may be microfabricated using a suitable microfabrication technique (e.g. an anisotropic wet etching technique). The microfabricated second substrate 202 with the second conductive layer 204 may be turned upside down and placed on top of the group of elastic support nodules 206, such that the wells 208 coincide with the group of elastic support nodules 206 to form the electrostatic actuation layer 200 (e.g. a single electrostatic actuation layer that may be combined with one or more additional electrostatic actuation layers into a multi-layer electrostatic actuator structure). In the electrostatic actuation layer 200, the elastic support nodules 206 may reside in the wells 208. Before the second substrate 202 is placed on top of the group of elastic support nodules 206, there may be adhesive 207 applied to the wells 208, to the group of elastic support nodules 206, or to both. In the example embodiments shown in FIG. 4, the depth of the wells 208 may be 90 micrometers. Other suitable depths may be used, depending on the thickness of the second substrate 202 to be microfabricated.

As the first substrate 201 and the second substrate 202 have been stacked one above the other (e.g., to form the electrostatic actuation layer 200), the distance between the first conductive layer 203 and the second conductive layer 204, which may be the distance between the first and second electrodes, in the electrostatic actuation layer 200 may be less than 1000 micrometers and, in some example embodiments, less than 20 micrometers. In the electrostatic actuation layer 200, the distance between said first and second conductive layers 203 and 204 may be 80 micrometers. Due to the wells 208 of the second substrate 202 coinciding (e.g. matching) with the group of elastic support nodules 206 on the first substrate 201, the distance between the first and second conductive layers 203 and 204 may be considerably less than the height of the group of elastic support nodules 206.

In the electrostatic actuation layer 200, the group of elastic support nodules 206 provides a compression space between the first and second conductive layers 203 and 204. In many example embodiments, the compression space is not entirely filled with solid material (e.g. the compression space is less than fully filled with solid material, such as solid elastic material). In the example embodiments shown in FIG. 4, the compression space may be 80 micrometers thick, and the layer of electrically insulating elastomer material 205 may be 20 micrometers thick, thus leaving a space gap of 60 micrometers. This space gap in the compression space may be filled with fluid (e.g. air, nitrogen, or a dielectric liquid, such as dielectric hydraulic fluid) in places where the elastic support nodules 206 are not present.

In the example embodiments shown in FIG. 4, the electrostatic actuation layer 200 (e.g. one of multiple electrostatic actuation layers within an electrostatic actuator) may also include a group of limiting nodules, which may be arranged in a grid array (e.g. similar to the row-column grid array illustrated in FIG. 2 or the triangular grid array illustrated in FIG. 3). This group of limiting nodules may be arranged between or among the elastic support nodules 206 and between the first substrate 201 and the second substrate 202, for limiting the compression of the compression space and thereby limiting the compression of the electrostatic actuation layer 200 overall. In the example embodiments shown in FIG. 4, any one or more of the conductive surfaces of the first and second conductive layers 203 and 204 on either or both sides of the space gap, the elastic support nodules 206, or both may be inherently hydrophobic, hydrophobically or superhydrophobically coated, hydrophobically or superhydrophobically treated, or any suitable combination thereof.

The electrostatic actuation layer 200 is configured (e.g. arranged) to compress when a sufficient voltage difference is applied between at least the first conductive layer 203 (e.g. functioning as a first electrode) and the second conductive layer 204 (e.g. functioning as a second electrode). Hence, an electrostatic actuator (e.g. electrostatic actuator structure) that includes one or more electrostatic actuation layers (e.g. electrostatic actuation layer 200) may be configured to compress in response to such a voltage difference between the first conductive layer 203 and the second conductive layer 204 (e.g. between respectively first and second conductive surfaces thereof) exceeding a threshold voltage difference (e.g. a predetermined threshold voltage difference). Accordingly, an electrostatic actuator that includes one or more of such electrostatic actuation layers may be configured to be compressed in response to application of such a voltage difference. According to various example embodiments, the electrostatic actuator may be included (e.g. embedded) as part of a flexible or elastic substrate. For example, the electrostatic actuator itself may be intrinsically flexible, elastic, or both, and may be included in such a flexible or elastic substrate. The electrostatic actuation layer 200 shown in FIG. 4 may have an overall thickness in the range of approximately 15 micrometers to approximately 500 micrometers, including the thickness of the first and second conductive layers 203 and 204 and, in some example embodiments, the thickness of the adhesive 207 applied between the wells 208 and the elastic support nodules 206.

Figure 5:
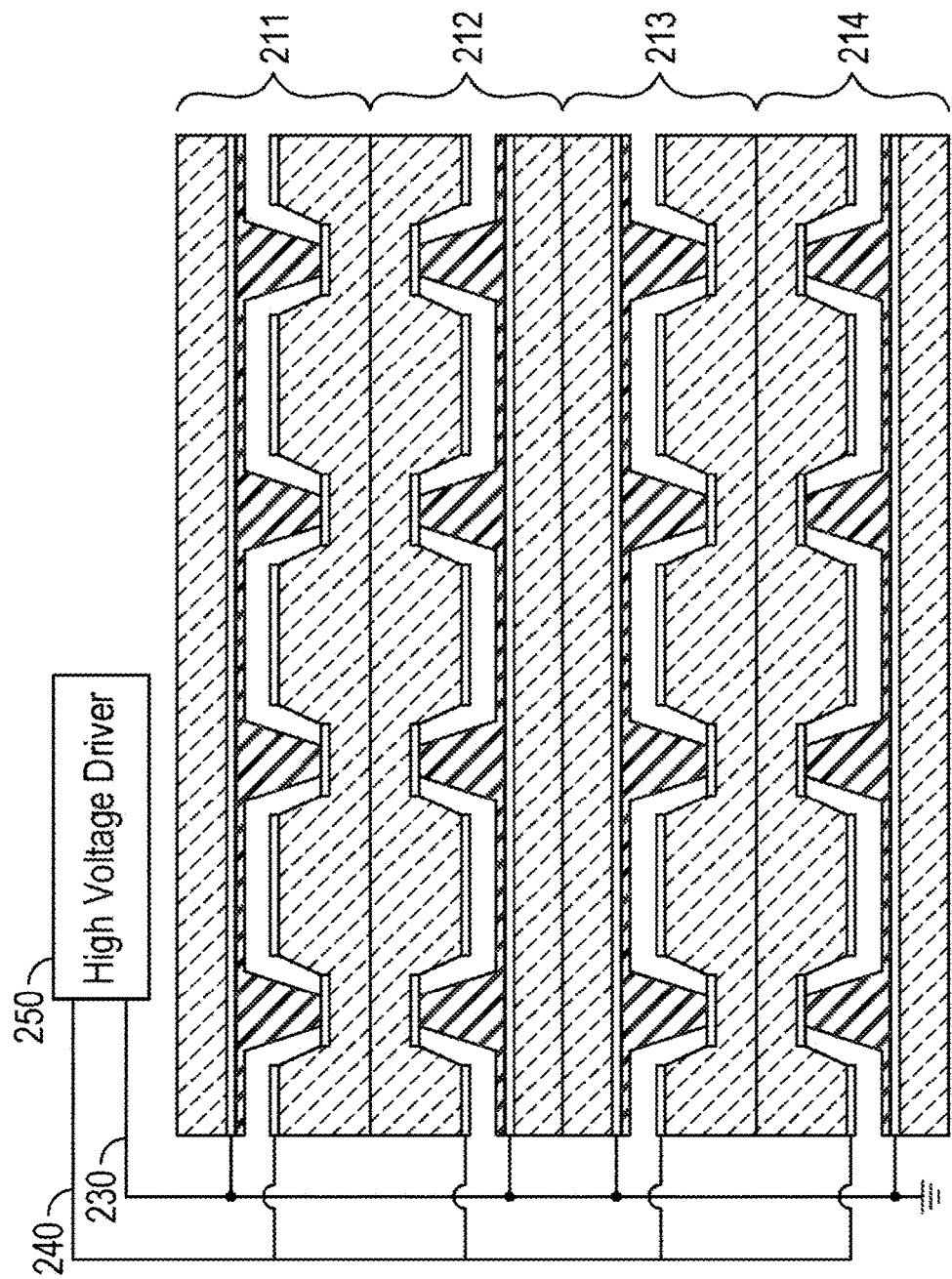
FIG. 5 is a cross-sectional diagram illustrating at least a portion of an electrostatic actuator with four electrostatic actuation layers, according to some example embodiments.

FIG. 5 is a cross-sectional diagram illustrating at least a portion of an electrostatic actuator (e.g. electrostatic actuator structure) with four electrostatic actuation layers, according to some example embodiments. The illustrated electrostatic actuator includes four electrostatic actuation layers 211-214. In the example embodiments shown in FIG. 5, each of the electrostatic actuation layers 211-214 includes a corresponding first substrate (e.g. first substrate 201) with a corresponding first conductive layer (e.g. first conductive layer 203), and the first conductive layer may be part of a first electrode 230. Similarly, each of the electrostatic actuation layers 211-214 includes a corresponding second substrate (e.g. second substrate 202) with a corresponding second conductive layer (e.g. second conductive layer 204), and the second conductive layer may be part of a second electrode 240. Moreover, the first conductive layer may be insulated (e.g. from its first substrate, from another conductive layer, or from both), the second conductive layer may be insulated (e.g. from its second substrate, from another conductive layer, or from both), or both.

Each of the electrostatic actuation layers 211-214 may further include a grid array that includes a group of elastic support nodules (e.g. elastic support nodules 206), and the group of elastic support nodules may be arranged between their corresponding first and second substrates, such that there is arranged a compression space between the first and second conductive layers (e.g. first and second conductive layers 203 and 204). In many example embodiments, the compression space is not entirely filled with solid material (e.g. the compression space is less than fully filled with solid material, such as solid elastic material). According to various example embodiments, the electrostatic actuator that includes the illustrated electrostatic actuation layers 211-214 may further include a high voltage driver 250 (e.g. a high voltage driver with a flyback-mode boost converter).

In the example embodiments shown in FIG. 5, the electrostatic actuation layers 211-214 are stacked one above the other, such that similar structural elements of the electrostatic actuation layers 211-214 coincide at least partially (e.g. coincide fully). For example, the elastic support nodules (e.g. elastic support nodules 206) of one electrostatic actuation layer 211 may be fully or partially aligned over the elastic support nodules of another electrostatic actuation layer 212. Similarly, the wells (e.g. wells 208) of one electrostatic actuation layer 211 may be fully or partially aligned over the wells of another electrostatic actuation layer 212. In alternative example embodiments, the electrostatic actuation layers 211-214 may be imbricatedly stacked (e.g. like overlapping roof tiles).

The electrostatic actuator shown in FIG. 5 is configured to compress when a sufficient voltage difference is applied between the first electrode 230 and the second electrode 240 (e.g. compress in response to such a voltage difference exceeding a threshold voltage difference, such as a predetermined threshold voltage difference). Due to the coinciding, adhered, and joint structure of the electrostatic actuation layers 211-214, the compression effect of the electrostatic actuator structure is increased substantially as a function of the number of coinciding electrostatic actuation layers. With the help of the adhered and joint structure of the electrostatic actuation layers 211-214, the appearance of holes or inter-layer gaps is avoided, and the potential reduction of the compression effect due to the potential inter-pillar swallowing for air compression is covered. Furthermore, potential inter-layer bouncing or non-uniform separation (e.g. due to inter-layer pulling forces resulting from the compression of each layer) is also avoided.

In the example embodiments shown in FIG. 5, the electrostatic actuation layers 211-216 are stacked one above another (e.g. as a stack of electrostatic actuation layers), such that a bifunctional substrate (e.g. a bifunctional substrate film) forms both the first substrate of one electrostatic actuation layer (e.g. electrostatic actuation layer 212) and the first substrate of an adjacent electrostatic actuation layer (e.g. electrostatic actuation layer 211) among the electrostatic actuation layers 211-216, one extending below the bifunctional substrate and the other extending above the bifunctional substrate. Alternatively, the bifunctional substrate may form both the second substrate of one electrostatic actuation layer (e.g. electrostatic actuation layer 212) and the second substrate of an adjacent electrostatic actuation layer (e.g. electrostatic actuation layer 211). Accordingly, such a bifunctional substrate can be considered as being or including (e.g. containing) the boundary between two adjacent electrostatic actuation layers (e.g. between the electrostatic actuation layers 211 and 212), as well as being or including the junction of the two adjacent electrostatic actuation layers. The bifunctional substrate may include a mesh of elastomer material.

Each of the electrostatic actuation layers 211-214 may have an overall thickness of approximately 365 micrometers. Accordingly, the thickness of the electrostatic actuator structure with the four electrostatic actuation layers 211-214 may be approximately four times 365 micrometers, thus resulting in a total thickness of approximately 1.46 millimeters. The electrostatic actuator structure may be hermetically sealed. The described compressing nodule structure, together with hermetic sealing, allows the compression of the electrostatic actuation layers 211-214 as a pump (e.g. a pneumatic pump or a hydraulic pump). In addition to the increased actuation produced by the combined compression of the electrostatic actuation layers 211-214, when hermetically sealed, the above-described elastic support nodules allow the compression of these layers as a pump (e.g. a pneumatic pump or a hydraulic pump). Fluid (e.g. gas or liquid) configured to flow into or out of the space gaps within the electrostatic actuation layers 211-214 can be used to actuate various elastic structures that are affected by the pressure of the fluid. This effect may be used to create a textured surface or to actuate some part of a system via pneumatic or hydraulic means.

Figure 6:
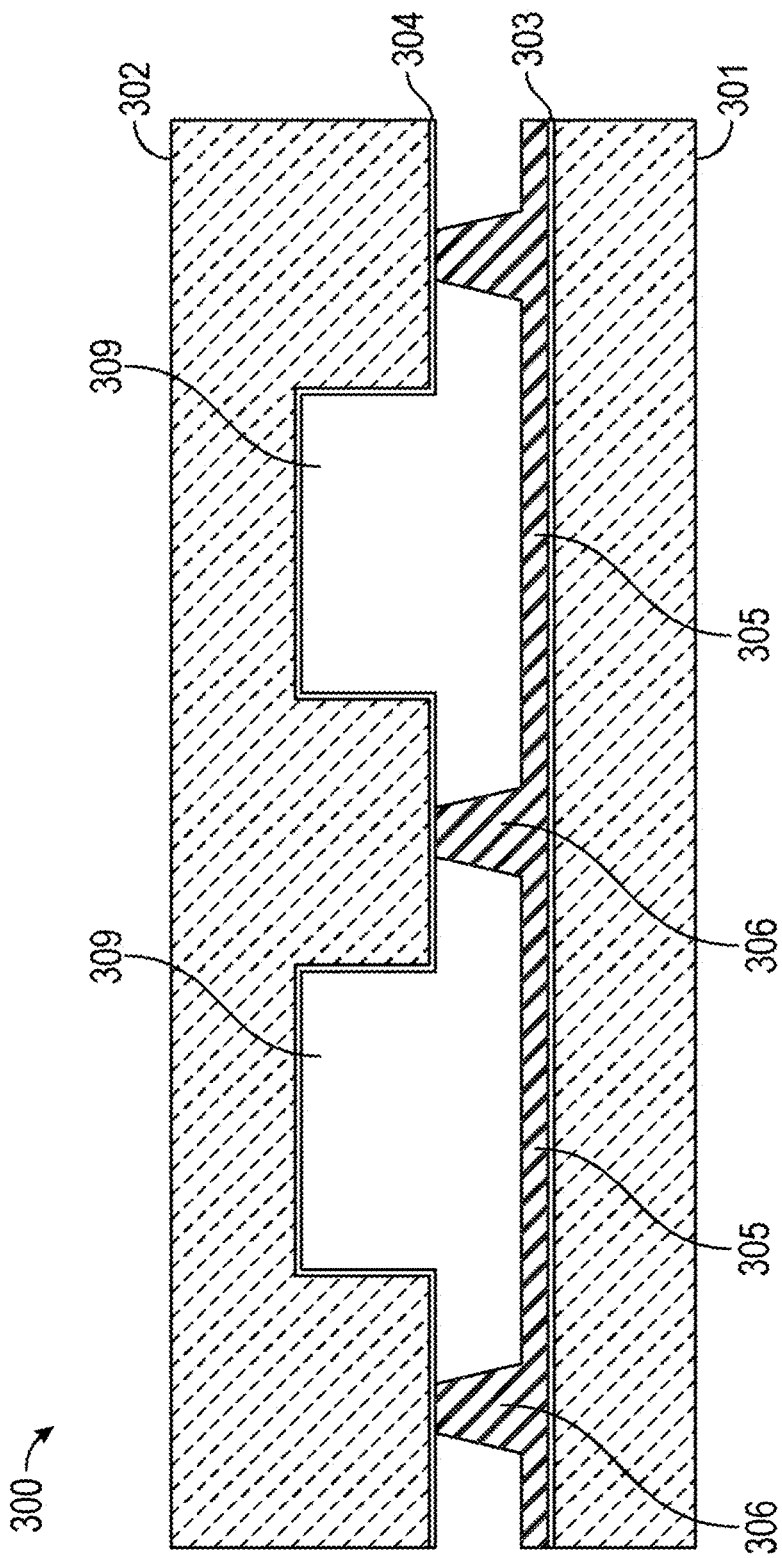
FIG. 6 is a cross-sectional diagram illustrating at least a portion of a single layer of an electrostatic actuator, according to some example embodiments.

FIG. 6 is a cross-sectional diagram illustrating at least a portion of a single electrostatic actuation layer 300 that may form all or part of an electrostatic actuator (e.g. electrostatic actuator structure), according to some example embodiments. The illustrated single electrostatic actuation layer 300 includes a first substrate 301 (e.g. a first substrate film) and a second substrate 302 (e.g. a second substrate film). In the example embodiments shown in FIG. 6, the first substrate 301 may have a thickness of 100 micrometers, and the second substrate 302 may have a thickness of 175 micrometers. The first substrate 301 may be a film that includes or otherwise provides a first conductive layer 303 (e.g. a first conductive electrode layer) applied on top of the first substrate 301. The first conductive layer 303 may form all or part of a first electrode. The second substrate 302 may be a film that includes or otherwise provides a second conductive layer 304 (e.g. a second conductive electrode layer) applied on top of the second substrate 302. The second conductive layer 304 may form all or part of a second electrode. According to various example embodiments, the first conductive layer 303, the second conductive layer 304, or both, are insulated.

The first substrate 301 (e.g. with the insulated first conductive layer 303) has a layer of electrically insulating elastomer material 305 (e.g. an electrically insulating elastomer coating) applied on top of the insulated first conductive layer 303 of the first substrate 301. Furthermore, there is a group (e.g., plurality or multitude) of elastic support nodules 306 arranged (e.g. in a grid array) and adhered on top of, or forming part of, the intrinsic structure of said layer of electrically insulating elastomer material 305. In the example embodiments shown in FIG. 6, the layer of electrically insulating elastomer material 305 may have a thickness of 20 micrometers. Furthermore, according to certain example embodiments, the elastic support nodules 306 each have a height of 80 micrometers. In addition, according to some example embodiments, the elastic support nodules 306 each have an aspect ratio of height to maximum width, and the aspect ratio may have a maximum value of two (2).

The layer of electrically insulating elastomer material 305, the group of elastic support nodules 306, or both may be applied using a suitable microfabrication technique (e.g. a thin film deposition technique). The group of elastic support nodules 306 may be fully or partially made of a silicon-based organic polymer (e.g. PDMS), rubber (e.g. natural or synthetic), or any suitable combination thereof. Furthermore, the group of elastic support nodules 306 may be arranged less than 10 millimeters apart from each other in distance, and in some example embodiments, the inter-nodule distance is less than 2 millimeters. In certain example embodiments, the group of elastic support nodules 306 is arranged in a grid array, such as a spaced two-dimensional row-column grid array, as illustrated in FIG. 2. In some alternative example embodiments, the group of elastic support nodules 306 is arranged in a spaced triangular grid array, as illustrated in FIG. 3.

Furthermore, the electrostatic actuation layer 300 may include one or more fluid reservoirs 309 (e.g. gas reservoirs, such as air reservoirs) that reduce the force involved for overall compression of the electrostatic actuation layer 300 when fluid displacement is restricted by contour sealing, when fluid displacement is restricted by compression speed (e.g. depending on the hydrodynamic properties of the fluid), when the fluid compresses, when the fluid moves from a compression space (e.g. a space gap), or any suitable combination thereof. The second substrate 302 may be microfabricated (e.g. etched) to provide the fluid reservoirs 309 (e.g. gas reservoirs) in the second substrate 302. The fluid reservoirs 309 may be arranged to reduce the compression ratio of fluid volume (e.g. gas volume, such as air volume). The fluid reservoirs 309 may be microfabricated using a suitable microfabrication technique (e.g. an anisotropic wet etching technique). The microfabricated second substrate 302 with the second conductive layer 304 may be turned upside down and placed on top of the group of elastic support nodules 306 to form the electrostatic actuation layer 300. In the example embodiments shown in FIG. 6, the depth of the fluid reservoirs 309 may be 90 micrometers. Other suitable depths may be used, depending on the thickness of the second substrate 302 to be microfabricated. The one or more fluid reservoirs 309 are in fluid communication with (e.g., connected to) one or more compression spaces in the electrostatic actuation layer 300.

In various example embodiments, the horizontal contour of these fluid reservoirs 309 (e.g. wells) can be ellipsoidal, and their centers can be located equidistant from each nodule in each group of four neighboring elastic support nodules (e.g. as shown in in FIG. 2 or FIG. 3). Alternatively, the fluid reservoirs 309 can have an arbitrary shape and can be located outside of the pillar region (e.g. somewhere in the contour of the elastic support nodules layer 306).

Figure 7:
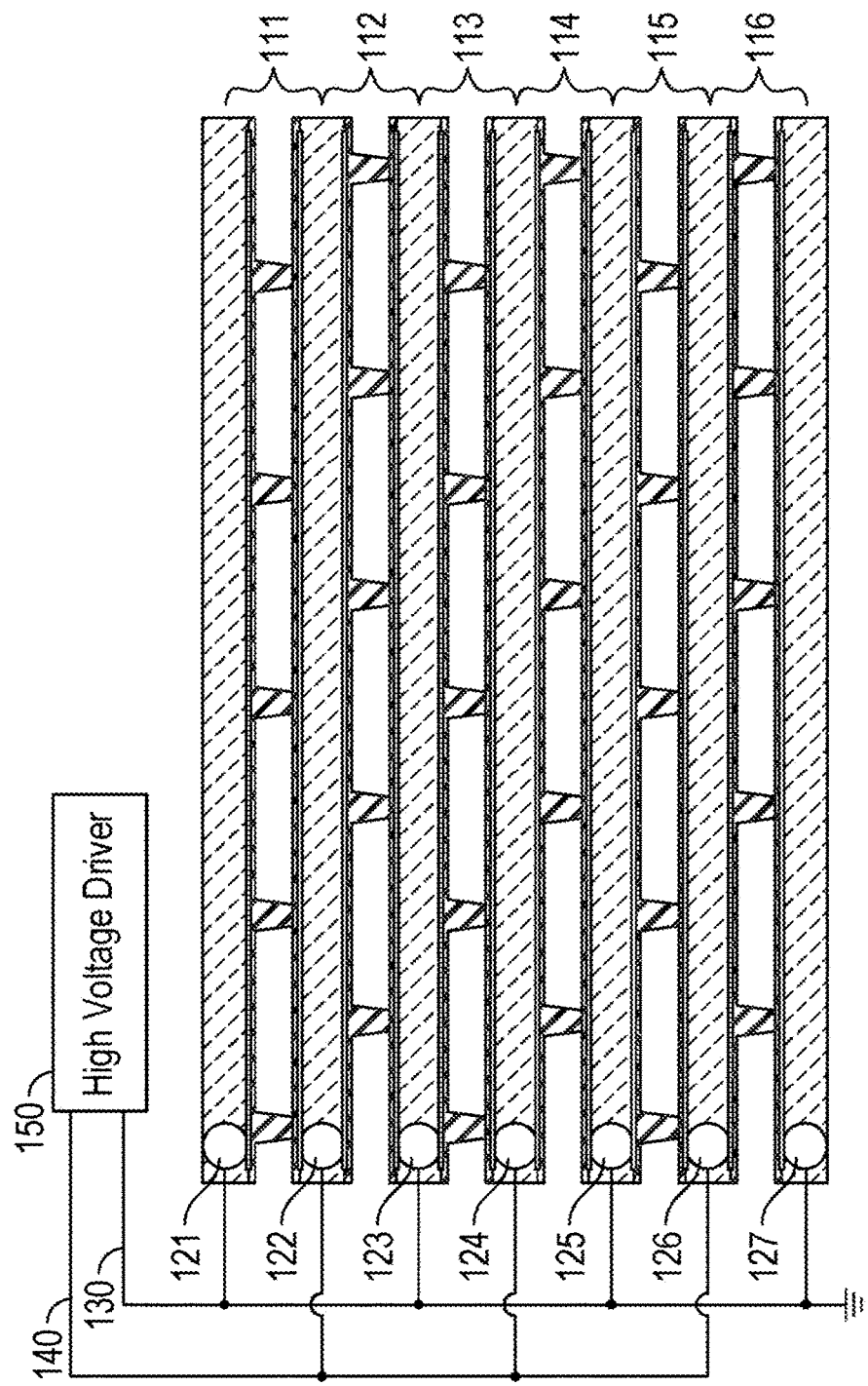
FIG. 7 is a cross-sectional diagram illustrating at least a portion of an electrostatic actuator with six electrostatic actuation layers, according to some example embodiments.

FIG. 7 is a cross-sectional diagram illustrating at least a portion of an electrostatic actuator (e.g. electrostatic actuator structure) with six electrostatic actuation layers, according to some example embodiments. The illustrated electrostatic actuator includes six electrostatic actuation layers 111-116. In the example embodiments shown in FIG. 7, each of the electrostatic actuation layers 111-116 includes a corresponding first substrate (e.g. first substrate 101) with a corresponding first conductive layer (e.g. first conductive layer 103), and the first conductive layer may be part of a first electrode 130. Similarly, each of the electrostatic actuation layers 111-116 includes a corresponding second substrate (e.g. second substrate 102) with a corresponding second conductive layer (e.g. second conductive layer 104), and the second conductive layer may be part of a second electrode 140. Moreover, the first conductive layer may be insulated (e.g. from its first substrate, from another conductive layer, or from both), the second conductive layer may be insulated (e.g. from its second substrate, from another conductive layer, or from both), or both.

In the example embodiments shown in FIG. 7, the electrostatic actuation layers 111-116 are stacked one above another (e.g. as a stack of electrostatic actuation layers), such that a bifunctional substrate (e.g. a bifunctional substrate film) forms both the first substrate of one electrostatic actuation layer (e.g. electrostatic actuation layer 112) and the first substrate of an adjacent electrostatic actuation layer (e.g. electrostatic actuation layer 111) among the electrostatic actuation layers 111-116, one extending below the bifunctional substrate and the other extending above the bifunctional substrate. Alternatively, the bifunctional substrate may form both the second substrate of one electrostatic actuation layer (e.g. electrostatic actuation layer 112) and the second substrate of an adjacent electrostatic actuation layer (e.g. electrostatic actuation layer 111). Accordingly, such a bifunctional substrate can be considered as being or including (e.g. containing) the boundary between two adjacent electrostatic actuation layers (e.g. between the electrostatic actuation layers 111 and 112), as well as being or including the junction of the two adjacent electrostatic actuation layers. The bifunctional substrate may include a mesh of elastomer material.

According to various example embodiments, the electrostatic actuator that includes the illustrated electrostatic actuation layers 111-116 may further include a high voltage driver 150 (e.g. a high voltage driver with a flyback-mode boost converter). Furthermore, any one or more of the substrates (e.g. a bifunctional substrate configured or functioning as both the first substrate of one electrostatic actuation layer and the second substrate of an adjacent electrostatic actuation layer) in the stack of electrostatic actuation layers 111-116 may include an embedded connection element. The electrostatic actuation layers 111-116 are shown in FIG. 7 as including embedded connection elements 121-127, any one or more of which may take the example form of an embedded metal wire or other conductive filament. The embedded connection elements 121-127 each connect one or more of the conductive layers (e.g. first conductive layer 103 or second conductive layer 104, one or more of which may be or include a conductive coating) to the high voltage driver 150. Within the stack of electrostatic actuation layers 111-116, the interior (e.g. non-exterior) embedded connection elements 122-126 connect the conductive electrode layers of the interior bifunctional substrates together and to the high voltage driver 150, as shown in FIG. 7.

Each of the electrostatic actuation layers 111-116 may further include a grid array that includes a group of elastic support nodules (e.g. elastic support nodules 106), and the group of elastic support nodules may be arranged between their corresponding first and second substrates, such that there is arranged a compression space between the first and second conductive layers (e.g. first and second conductive layers 103 and 104). In many example embodiments, the compression space is not entirely filled with solid material (e.g. the compression space is less than fully filled with solid material, such as solid elastic material).

Figure 8:
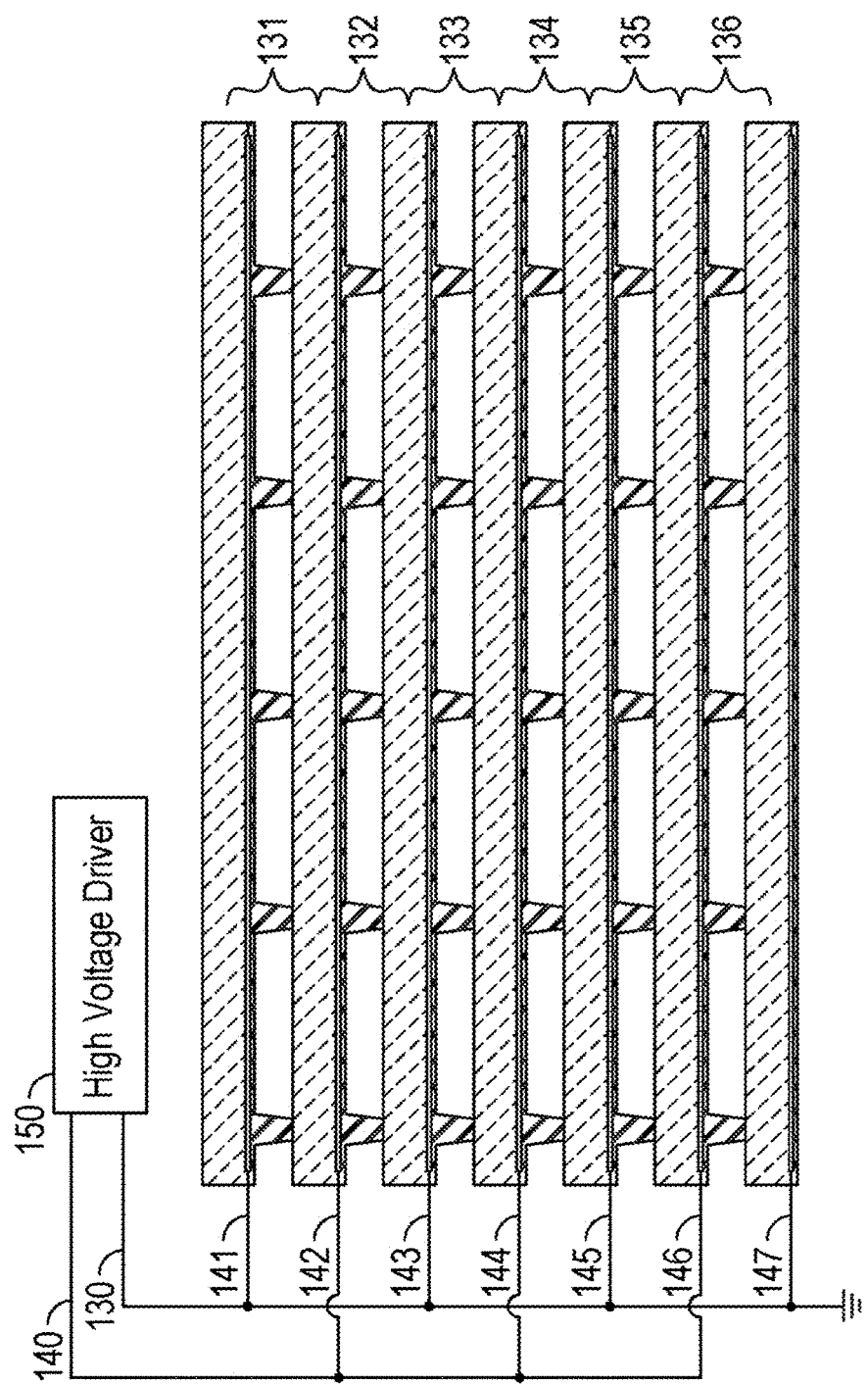
FIG. 8 is a cross-sectional diagram illustrating at least a portion of an electrostatic actuator with six electrostatic actuation layers, according to some example embodiments.

FIG. 8 is a cross-sectional diagram illustrating at least a portion of an electrostatic actuator (e.g. electrostatic actuator structure) with six electrostatic actuation layers, according to some example embodiments. The illustrated electrostatic actuator includes six electrostatic actuation layers 131-136. In the example embodiments shown in FIG. 8, each of the electrostatic actuation layers 131-136 includes a corresponding first substrate (e.g. first substrate 101) with a corresponding first conductive layer (e.g. first conductive layer 103), and the first conductive electrode layer may be part of a first electrode (e.g. first electrode 130). Similarly, each of the electrostatic actuation layers 131-136 includes a corresponding second substrate (e.g. second substrate 102) with a corresponding second conductive layer (e.g. second conductive layer 104), and the second conductive layer may be part of a second electrode (e.g. second electrode 140). Moreover, the first conductive layer may be insulated (e.g. from its first substrate, from another conductive layer, or from both), the second conductive layer may be insulated (e.g. from its second substrate, from another conductive layer, or from both), or both.

In the example embodiments shown in FIG. 8, the electrostatic actuation layers 131-136 are stacked one above another (e.g. as a stack of electrostatic actuation layers), such that a bifunctional substrate (e.g. a bifunctional substrate film) forms both the first substrate of one electrostatic actuation layer (e.g. electrostatic actuation layer 132) and the second substrate of an adjacent electrostatic actuation layer (e.g. electrostatic actuation layer 131) among the electrostatic actuation layers 131-136, one extending below the bifunctional substrate and the other extending above the bifunctional substrate. Accordingly, such a bifunctional substrate can be considered as being or including (e.g. containing) the boundary between two adjacent electrostatic actuation layers (e.g. between the electrostatic actuation layers 131 and 132), as well as being or including the junction of the two adjacent electrostatic actuation layers. The bifunctional substrate may include a mesh of elastomer material.

According to various example embodiments, the electrostatic actuator that includes the illustrated electrostatic actuation layers 131-136 may further include a high voltage driver (e.g. high voltage driver 150, which may have a flyback-mode boost converter). Furthermore, any one or more of the substrates (e.g. a bifunctional substrate configured or functioning as both the first substrate of one electrostatic actuation layer and the second substrate of an adjacent electrostatic actuation layer) in the stack of electrostatic actuation layers 131-136 may include an embedded connection element. The electrostatic actuation layers 131-136 are shown in FIG. 8 as including embedded connection elements 141-147, any one or more of which may take the example form of an embedded wire or other conductive filament. The embedded connection elements 141-147 each connect one or more of the conductive layers (e.g. first conductive layer 103 or second conductive layer 104, one or more of which may be or include a conductive coating) to the high voltage driver (e.g. high voltage driver 150), as shown in FIG. 8.

Each of the electrostatic actuation layers 131-136 may further include a grid array that includes a group of elastic support nodules (e.g. elastic support nodules 106), and the group of elastic support nodules may be arranged between their corresponding first and second substrates, such that there is arranged a compression space between the first and second conductive layers (e.g. first and second conductive layers 103 and 104). In many example embodiments, the compression space is not entirely filled with solid material (e.g. the compression space is less than fully filled with solid material, such as solid elastic material).

Figure 9:
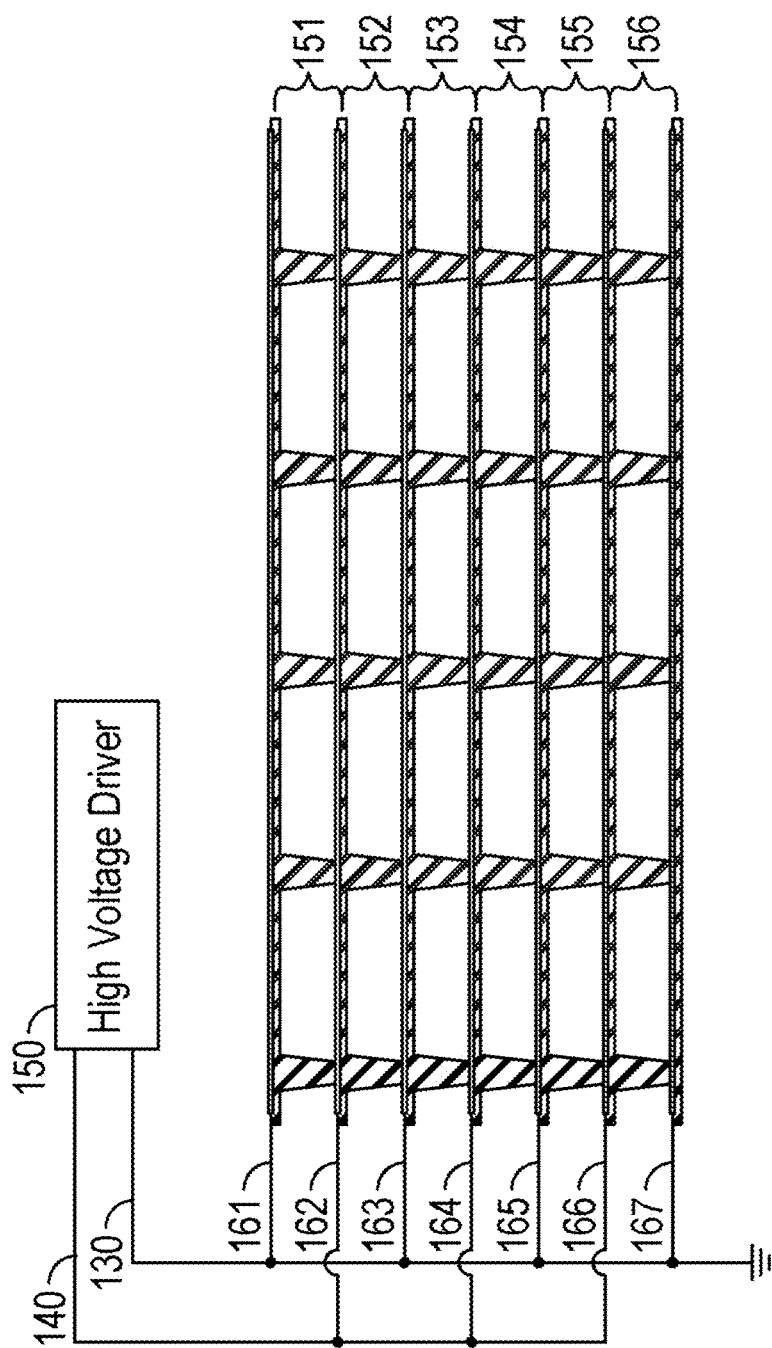
FIG. 9 is a cross-sectional diagram illustrating at least a portion of an electrostatic actuator with six electrostatic actuation layers, according to some example embodiments.

FIG. 9 is a cross-sectional diagram illustrating at least a portion of an electrostatic actuator (e.g. electrostatic actuator structure) with six electrostatic actuation layers, according to some example embodiments. The illustrated electrostatic actuator includes six electrostatic actuation layers 151-156. In the example embodiments shown in FIG. 9, each of the electrostatic actuation layers 151-156 includes a corresponding first substrate (e.g. first substrate 101) with a corresponding first conductive layer (e.g. first conductive layer 103), and the first conductive layer may be part of a first electrode (e.g. first electrode 130). Similarly, each of the electrostatic actuation layers 151-156 includes a corresponding second substrate (e.g. second substrate 102) with a corresponding second conductive layer (e.g. second conductive layer 104), and the second conductive layer may be part of a second electrode (e.g. second electrode 140). Moreover, the first conductive layer may be insulated (e.g. from its first substrate, from another conductive layer, or from both), the second conductive layer may be insulated (e.g. from its second substrate, from another conductive layer, or from both), or both.

In the example embodiments shown in FIG. 9, the electrostatic actuation layers 151-156 are stacked one above another (e.g. as a stack of electrostatic actuation layers), such that a bifunctional layer of electrically insulating elastomer material forms both the first substrate of one electrostatic actuation layer (e.g. electrostatic actuation layer 152) and the second substrate of an adjacent electrostatic actuation layer (e.g. electrostatic actuation layer 151) among the electrostatic actuation layers 151-156, one extending below the bifunctional layer and the other extending above the bifunctional layer. Accordingly, such a bifunctional layer of electrically insulating elastomer material can be considered as being or including (e.g. containing) the boundary between two adjacent electrostatic actuation layers (e.g. between the electrostatic actuation layers 151 and 152), as well as being or including the junction of the two adjacent electrostatic actuation layers. The bifunctional substrate may include a mesh of elastomer material. Furthermore, in certain example embodiments, a bifunctional conductive layer (e.g. a bifunctional conductive electrode layer) is applied to the bifunctional layer of electrically insulating elastomer material and thus arranged to act as both a first conductive layer (e.g. first conductive layer 103) and a second conductive layer (e.g. second conductive layer 104) for a pair of adjacent electrostatic actuation layers (e.g. electrostatic actuation layers 151 and 152), one extending below the bifunctional conductive layer and the other extending above the bifunctional conductive layer.

According to various example embodiments, the electrostatic actuator that includes the illustrated electrostatic actuation layers 151-156 may further include a high voltage driver (e.g. high voltage driver 150, which may have a flyback-mode boost converter). Furthermore, any one or more of the bifunctional layers (e.g. a bifunctional layer of electrically insulating elastomer material or a bifunctional conductive layer) in the stack of electrostatic actuation layers 151-156 may include an embedded connection element. The electrostatic actuation layers 151-156 are shown in FIG. 9 as including embedded connection elements 161-167, any one or more of which may take the example form of an embedded wire or other conductive filament. The embedded connection elements 161-167 each connect one or more of the conductive layers (e.g. one or more bifunctional conductive layers, any one or more of which may be or include a conductive coating) to the high voltage driver (e.g. high voltage driver 150), as shown in FIG. 9.

Each of the electrostatic actuation layers 151-156 may further include a grid array that includes a group of elastic support nodules (e.g. elastic support nodules 106), and the group of elastic support nodules may be arranged between their corresponding first and second substrates, such that there is arranged a compression space between the first and second conductive layers (e.g. first and second conductive layers 103 and 104). In many example embodiments, the compression space is not entirely filled with solid material (e.g. the compression space is less than fully filled with solid material, such as solid elastic material).

Any combination of one or more of the above-described electrostatic actuation layers (e.g. electrostatic actuation layer 100, 200, or 300) may be included in an electrostatic actuator (e.g. an electrostatic actuator structure), and such included electrostatic actuation layers may be stacked one above the other to form at least two stacks of electrostatic actuation layers, as illustrated in FIGS. 10A, 10B, 11A, and 11B. In the example embodiments shown in FIGS. 10A, 10B, 11A, and 11B, any one or more of the first and second conductive surfaces of the first and second conductive layers on either or both sides of the space gap, the elastic support nodules, or both, may be inherently hydrophobic, hydrophobically or superhydrophobically coated, hydrophobically or superhydrophobically treated, or any suitable combination thereof.

FIGS. 10A, 10B, 11A, and 11B are cross-sectional diagrams each illustrating an electrostatic actuator 1000 (e.g. electrostatic actuator structure), which may have multiple (e.g. at least two stacks) of electrostatic actuation layers (e.g. at least two separate stacks that each include multiple instances of the electrostatic actuation layer 100, 200, or 300). In alternative example embodiments, the electrostatic actuator 1000 has a single stack, and the single stack has a cavity (e.g. a hole) that, when viewed in cross-section, has the appearance shown in FIG. 10A, 10B, 11A, or 11B. Each stack includes at least one fluid reservoir (e.g. fluid reservoir 309, which may be a gas reservoir, such as an air reservoir) arranged between the at least two stacks of electrostatic actuation layers. Moreover, there may be an elastic surface layer arranged on top of the at least two stacks of electrostatic actuation layers and on top of said at least one fluid reservoir (e.g. covering both the at least two stacks and the at least one fluid reservoir).

Figure 10A:
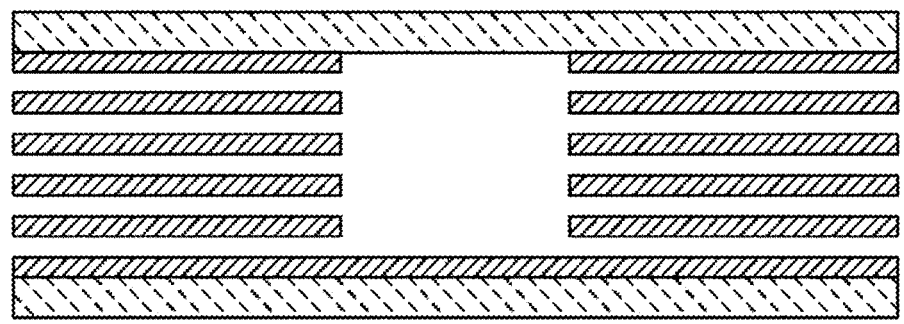
FIGS. 10A and 10B are cross-sectional diagrams each illustrating at least two stacks of electrostatic actuation layers, according to some example embodiments.
Figure 10B:
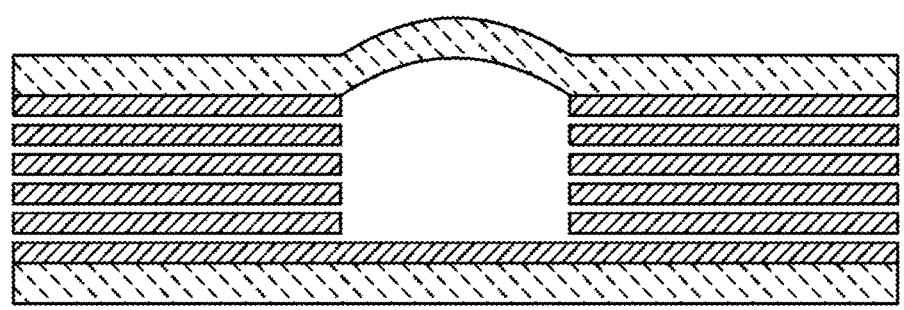
Figure 11A:
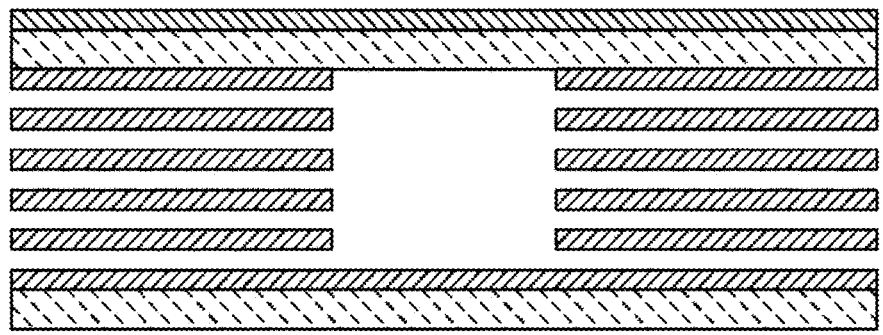
FIGS. 11A and 11B are cross-sectional diagrams each illustrating at least two stacks of electrostatic actuation layers, with an additional firm structure, according to some example embodiments.
Figure 11B:
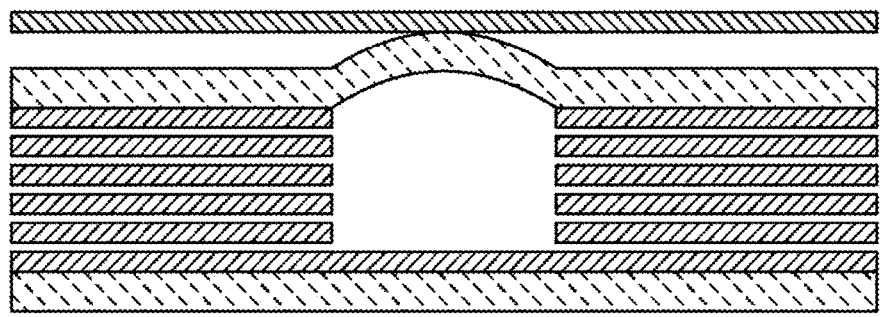

In FIGS. 11A and 11B, the electrostatic actuator 1000 also has an additional firm (e.g. rigid) structure on top of the elastic surface layer. The firm structure may facilitate a homogeneous (e.g. flat) area of actuation, collect actuation power from multiple bulges, protect flexible layers from the environment, or any suitable combination thereof. FIGS. 10A and 11A depict the electrostatic actuator 1000 in a state of rest. FIGS. 10B and 11B depict the electrostatic actuator 1000 when the stacked electrostatic actuation layers are being compressed, such that the elastic surface layer on top of at least one fluid reservoir bulges accordingly as a result of the electrostatic actuation layers being compressed. In FIGS. 11A and 11B, the electrostatic actuator 1000 may include an additional grid array of limiting nodules, which may be arranged between the elastic surface layer and the firm structure, for facilitating the entrance of air between both layers in the expansion process from the configuration shown in FIG. 11A to the configuration shown in FIG. 11B.

Figure 12A:
FIGS. 12A, 12B, and 12C are cross-sectional diagrams each illustrating at least a portion of a single layer of an electrostatic actuator, according to some example embodiments.
Figure 12B:
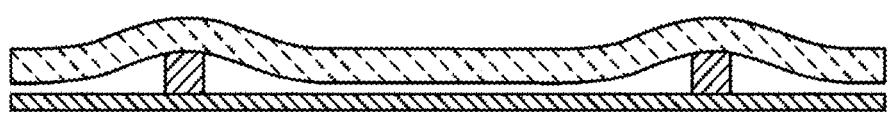
Figure 12C:

FIGS. 12A, 12B, and 12C are cross-sectional diagrams each illustrating at least a portion of a single layer (e.g. a single electrostatic actuation layer) within the electrostatic actuator 1000, according to some example embodiments. In some example embodiments, such a single layer forms the entirety of an electrostatic actuation structure. In alternative example embodiments, such a single layer is one layer (e.g. a topmost or exterior layer) among multiple electrostatic actuation layers included in an electrostatic actuation structure. As shown in FIGS. 12A, 12B, and 12C, the illustrated single layer has a flexible upper substrate.

FIG. 12A depicts the single layer (e.g. the single electrostatic actuation layer) in a state of rest. FIG. 12B depicts the single layer when being partially compressed (e.g. due to a voltage difference across its first and second electrodes transgressing (e.g. exceeding) a first threshold voltage difference). FIG. 12C depicts the single layer when being fully compressed (e.g. due to the voltage difference across its first and second electrodes transgressing a second threshold voltage difference, which may be higher than the first threshold voltage difference). In FIGS. 12B and 12C, as the flexible upper substrate of the single layer is being compressed, fluid flows from the corresponding compression space (e.g. space) and creates one or more bulges in the flexible upper substrate. These bulges may occur at the positions of the elastic support nodules (e.g. elastic support nodules 106).

As noted above, in certain example embodiments, one or more electrostatic actuation layers (e.g. electrostatic actuation layer 100, 200, or 300) within the electrostatic actuator 1000 (e.g. electrostatic actuator structure) may be stacked one above the other in an aligned manner. For example, the elastic support nodules (e.g. elastic support nodules 106) of one electrostatic actuation layer may be fully or partially aligned over the elastic support nodules of another (e.g. adjacent) electrostatic actuation layer. Similarly, if present, the wells (e.g. wells 208) of one electrostatic actuation layer may be fully or partially aligned over the wells of another (e.g. adjacent) electrostatic actuation layer.

However, in certain alternative example embodiments, one or more electrostatic actuation layers (e.g. electrostatic actuation layer 100, 200, or 300) within the electrostatic actuator 1000 may be imbricatedly stacked one above the other without such alignment (e.g. such that each node resides at the center of mass of a system formed by its closest four neighbor nodes, in the adjacent layer). For example, FIG. 7 illustrates a situation in which the elastic support nodules (e.g. elastic support nodules 106) of one electrostatic actuation layer are not aligned (e.g. are completely unaligned) with the elastic support nodules of another (e.g. adjacent) electrostatic actuation layer. Likewise, if present, the wells (e.g. wells 208) of one electrostatic actuation layer are not aligned with the wells of another (e.g. adjacent) electrostatic actuation layer.

Generally speaking, electrostatic actuators with imbricatedly stacked electrostatic actuation layers may be less vulnerable to overall bending under the aggregated (e.g. compounded) forces, deformations, or both in the stacked electrostatic actuation layers. This may provide the benefit of maximizing the amplitude of compression in situations where there is some layer bending in the inter-node space. This may also provide the benefit of an overall structure in which the stack of electrostatic actuation layers compresses approximately uniformly, despite localized bending occurring in one or more individual layers within the overall structure. "Bending" in this context refers to a process by which one or more of the electrostatic actuation layers become curved, such that interstitial regions between the elastic support nodules (e.g. elastic support nodules 106 or 206) experience more compression than regions near or at the elastic support nodules.

In certain example embodiments, the electrostatic actuator 1000 (e.g. electrostatic actuator structure) includes a grid of relatively rigid tile structures and relatively malleable areas between the tile structures. This may provide the benefit of allowing the bending of the actuator surface (e.g. uppermost or exterior substrate) at the relatively malleable areas, while retaining local rigidity at or near the relatively rigid tile structures. The relatively rigid tile structures may facilitate compression while providing resistance to bending between the elastic support nodules when the voltage difference is applied to the first and second electrodes of the electrostatic actuation layers.

In various example embodiments, instead of elastic support nodules (e.g. elastic support nodules 106), the electrostatic actuator 1000 (e.g. electrostatic actuator structure) may include rigid supports (e.g. non-elastic support nodules), elastic layer materials, foam-filled structures, continuous supports, continuous limiting structures, web structures, bulging supports (e.g. attached to a top layer) or any suitable combination thereof. According to some example embodiments, one or more elastic support nodules may be replaced by sealed (e.g. hermetically sealed or non-hermetically sealed), gas-filled (e.g. air-filled) cells that function as springs when compressed. According to certain example embodiments, one or more elastic support nodules may be replaced by solid semi-foam, again to function as a spring between the first and second electrodes. As used herein, "solid semi-foam" refers to a solid foam in which air pockets (e.g. air bubbles) are not completely sealed, but rather are polymerized, resulting in holes in the solid walls between the air pockets. According to various example embodiments, the electrostatic actuator 1000 includes a three-dimensional (3D) printed or moulded grid made from one or more suitable polymers that function as springs when compressed. According to some example embodiments, one or more elastic support nodules may be replaced by constrained magnets arranged in repulsion (e.g. with similar poles facing each other) to function as springs (e.g. with higher spring constant values).

In FIGS. 12A, 12B, and 12C, the electrostatic actuator 1000 may include an additional grid array of limiting nodules, which may be arranged between the elastic surface layer and the firm structure, for facilitating the entrance of air between both layers in the expansion process from the configuration shown in FIG. 12C, through the configuration shown in FIG. 12B, to the configuration shown in FIG. 12A.

According to some example embodiments, the grid array of elastic support nodules is in direct contact with both the top and bottom insulated conductive electrode layers, without any additional layer of electrically insulating elastomer material. In certain example embodiments, the grid array of elastic support nodules forms part of the intrinsic structure of a bottom grid of elastomer material, located between the nodules and the bottom insulated conductive electrode layer. According to various example embodiments, the grid array of elastic support nodules is adhered to both top and bottom layers of electrically insulating elastomer material, or forms part of the intrinsic structure of both top and bottom layers of electrically insulating elastomer material.

Figure 13:
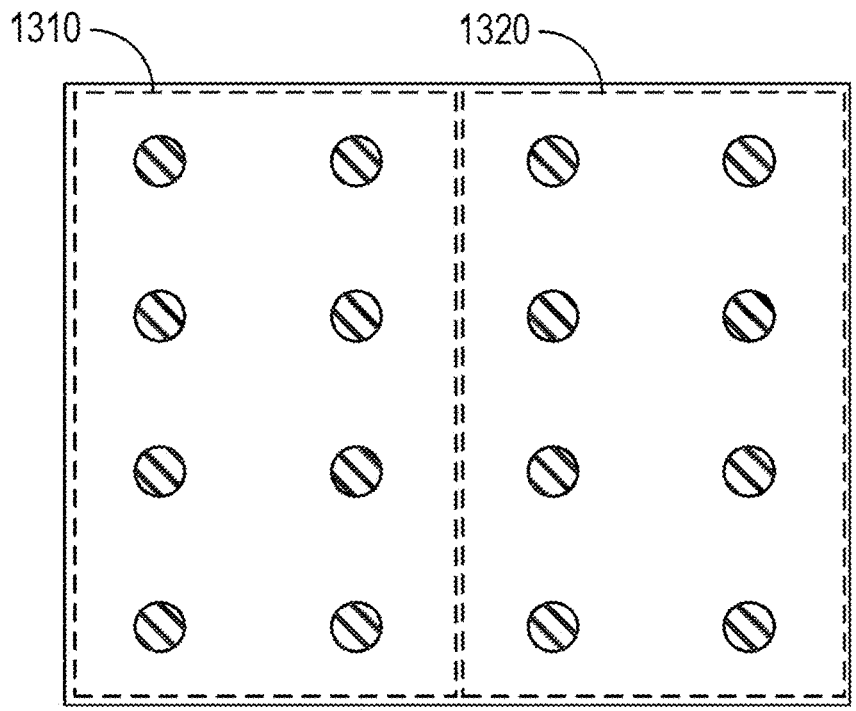
FIG. 13 is a plan view diagram illustrating a multitude of elastic support nodules, arranged in a spaced two-dimensional row-column grid array, with a first zone in which first and second electrodes are present, and with a second zone in which first and second electrodes are absent, according to some example embodiments.
Figure 14:
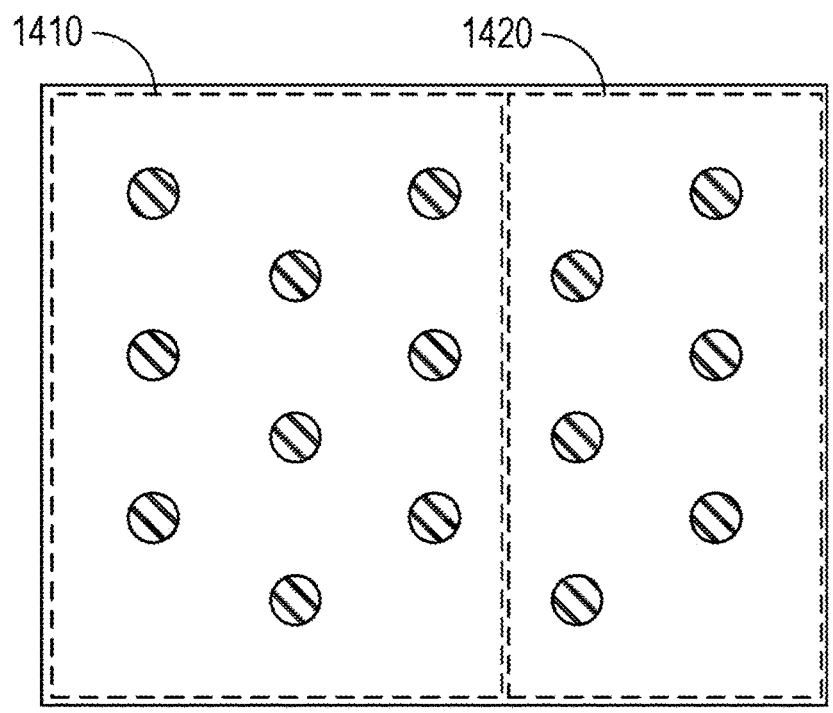
FIG. 14 is a plan view diagram illustrating a multitude of elastic support nodules, arranged in a spaced triangular grid array, with a first zone in which first and second electrodes are present, and with the second zone in which first and second electrodes are absent, according to some example embodiments.

As shown in FIG. 13 and FIG. 14, the electrostatic actuator 1000 may include non-uniform electrodes (e.g. a first or second electrode that does is not coextensive with the entire multitude of elastic support nodules). In FIG. 13, the elastic support nodules in a first zone 1310 are arranged between a first electrode (e.g. first conductive layer 103) and a second electrode (e.g. second conductive layer 104), and the first and second electrodes are present within the first zone 1310. However, in FIG. 13, the elastic support nodules in a second zone 1320 are not arranged between any electrodes, and the first and second electrodes do not extend into the second zone 1320.

Accordingly, while the multitude of elastic support nodules may be uniform and homogeneous (e.g. arranged in a grid array), the electrostatic actuator 1000 can produce one or more non-uniform pressure patterns that result in three-dimensional formations (e.g., one or more ridges) on the surface of the electrostatic actuator 1000. This is facilitated by the elastic surface material of the electrostatic actuator 1000, fluid material flowing from the first zone 1310 to the second zone 1320, or both, within the compression space. For example, such fluid flow may be resultant from the electrostatic pressure being lower in the second zone 1320 where electrodes are absent, compared to the first zone 1310 where electrodes are present.

Similarly, in FIG. 14, the elastic support nodules in a first zone 1410 are arranged between a first electrode (e.g. first conductive layer 103) and a second electrode (e.g. second conductive layer 104), and the first and second electrodes are present within the first zone 1410. However, in FIG. 14, the elastic support nodules in a second zone 1420 are not arranged between any electrodes, and the first and second electrodes do not extend into the second zone 1420. As noted above, while the multitude of elastic support nodules may be uniform and homogeneous (e.g. arranged in a triangular array), the electrostatic actuator 1000 can produce one or more non-uniform pressure patterns that result in three-dimensional formations (e.g. one or more ridges) on the surface of the electrostatic actuator 1000. This is facilitated by the elastic surface material of the electrostatic actuator 1000, fluid material flowing from the first zone 1410 to the second zone 1420, or both, within the compression space. For example, such fluid flow may be resultant from the electrostatic pressure being lower in the second zone 1420 where electrodes are absent, compared to the first zone 1410 where electrodes are present.

As a result, the non-uniform electrodes may cause the surface of the electrostatic actuator 1000 to produce a three-dimensional mechanical oscillation pattern (e.g. a pattern of one or more three-dimensional ridges, bulges, depressions, or any suitable combination thereof). For example, fluid flow from a first zone (e.g. first zone 1310 or 1410) to a second zone (e.g. second zone 1320 or 1420) may cause the second zone to bulge as the first zone compresses, and such bulging may contribute to the production of the three-dimensional mechanical oscillation pattern.

In some example embodiments, a bulging second zone pushes on a rigid surface layer that is mechanically coupled to the elastic surface layer and causes the rigid surface layer to move away from the remainder of the electrostatic actuator 1000. For example, if the second substrate 102 is mechanically coupled to the rigid surface layer within the second zone 1320, the bulging of the second zone 1320 pushes the rigid surface layer away from the first substrate 101, at least within the second zone 1320. Similarly, if the second substrate 202 is mechanically coupled to the rigid surface layer within the second zone 1420, the bulging of the second zone 1420 pushes the rigid surface layer away from the first substrate 201, at least within the second zone 1420.

As is well-known, an actuator operates at high voltages, creating potential differences between the layers causing them to be compressed. In a stacked structure, when the layers are very close and there is insufficient isolation, these different potentials can cause sparks between the electrodes. Prior arts have attempted to solve this problem by forming an electrode that only partly covers the top surface of the substrate upon which it is disposed, creating one gap between the electrode and the substrate edges. This increases the distance between the electrode edges from adjacent layers on the structure, thus minimizing the possibility of sparks occurring between the said layers.

Figure 15A:
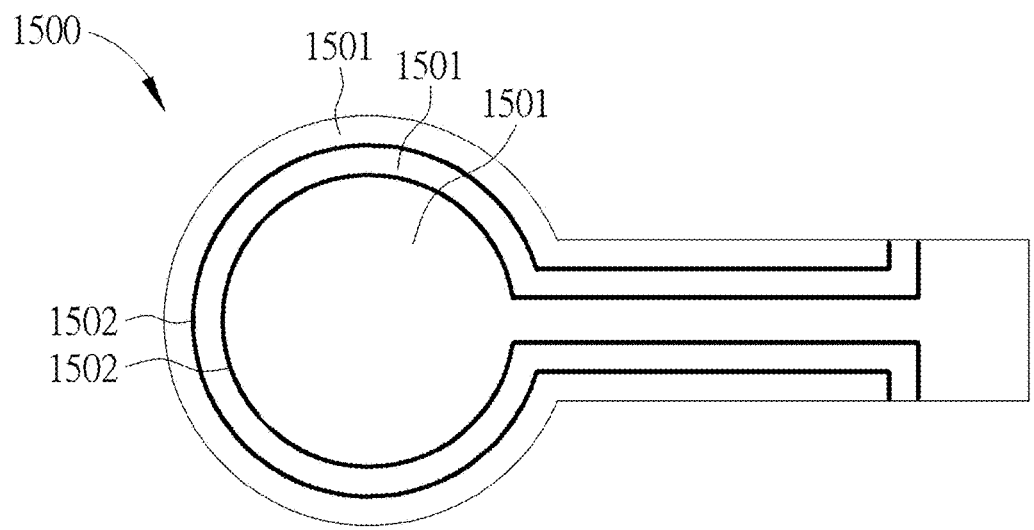
FIG. 15A is a top view of an active element (AE) layer according to an exemplary embodiment of the present invention.
Figure 15B:
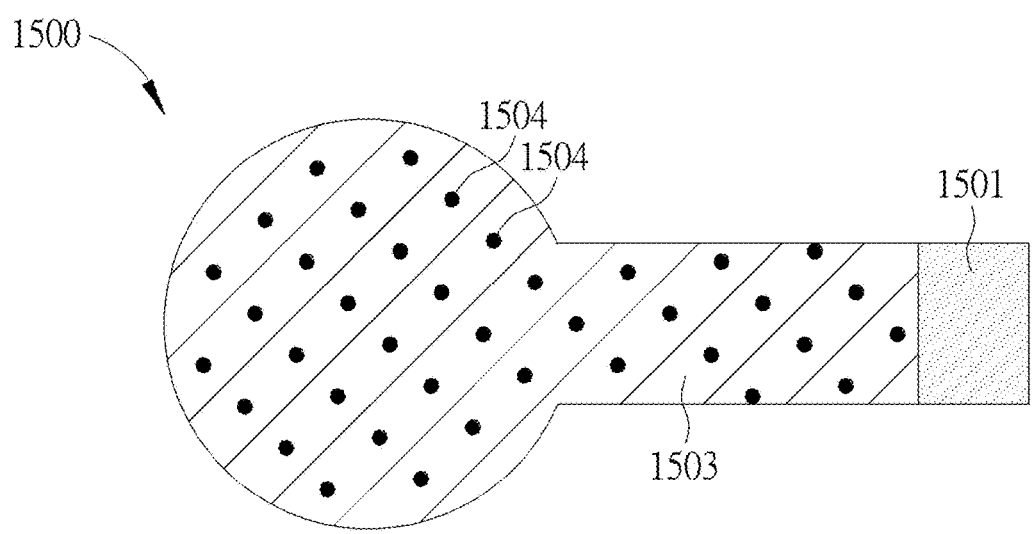
FIG. 15B is a bottom view of the flat active element (AE) layer in FIG. 15A.
Figure 15C:
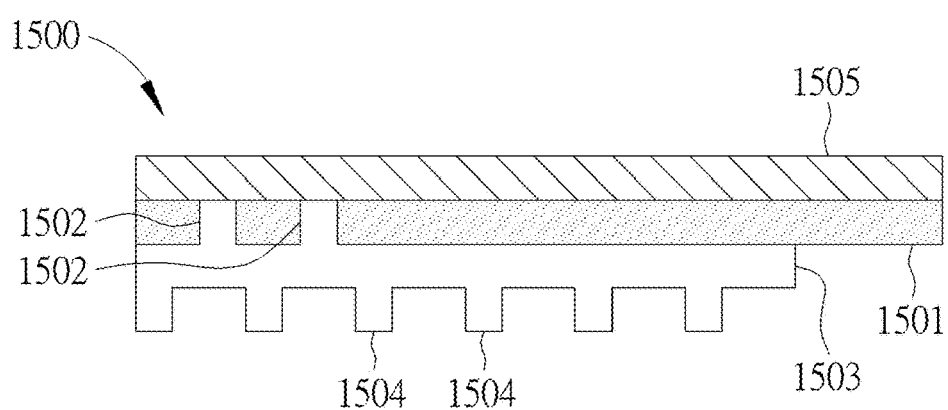
FIG. 15C is a cross-sectional view of the flat active element (AE) layer in FIG. 15A.

The present invention provides a structure which can also solve the problem of sparks occurring between successive layers of an actuator or sensor, while preserving the robustness of the stacked structure and using a simple manufacturing process. Refer to FIG. 15A, which is a top view of an electrode 1500 according to an exemplary embodiment of the present invention. As shown in FIG. 15A, the electrode 1500 contains a series of indented, i.e. scratched, grooved or etched lines 1502, which follow the shape of the electrode and connect to the protruding end. FIG. 15B shows the underside of the electrode 1500 shown in FIG. 15A, wherein the elastic pillars 1504 are disposed on the underside. FIG. 15C is a cross-sectional diagram of an active element (AE) 1500 having the structure shown in FIG. 15A and FIG. 15B. As shown in FIG. 15C, the etched lines 1502 fully cut through the conductive layer 1501 but do not penetrate the substrate 1505. In some embodiments, the etched lines may penetrate the substrate but will not fully cut through it, as the aim is to provide isolation. This allows isolation between stacked layers. In the example shown in FIGS. 15A, 15B and 15C, the electrode 1500 comprises two parallel etched lines. This is merely for illustrative purposes, however. In one embodiment, the electrode may have a single etched line, or may have multiple etched lines. Two etched lines is a preferred embodiment, as the number of etched lines may be limited by the size of the electrode. More than one etched line further ensures that isolation can be achieved even if one of the etched lines has a defect such that complete electrical isolation between both sides of the gap is not achieved. The distance between the etched lines will depend on the intended voltage used in the system.

In some embodiments, these etched lines (gaps) may be filled by an insulator layer (the elastic layer) 1503. This typically occurs by first etching the gaps and then creating the elastic layer 1503 on top of the electrode layer (conductive layer) 1501. This may also be achieved by a wet coating process. This provides additional insulation. In other embodiments, there may also be an additional insulator layer. By etching lines into the electrodes rather than forming electrodes with different dimensions than their respective substrates, all layers of the stacked actuator or sensor can have the same horizontal dimensions from the top view of the stacked actuator or sensor as shown in FIG. 15A, making the entire structure more robust.

Etching can be performed by any profiling tool, such as a CNC machine, a blade or a laser. No chemicals are required.

Figure 16A:
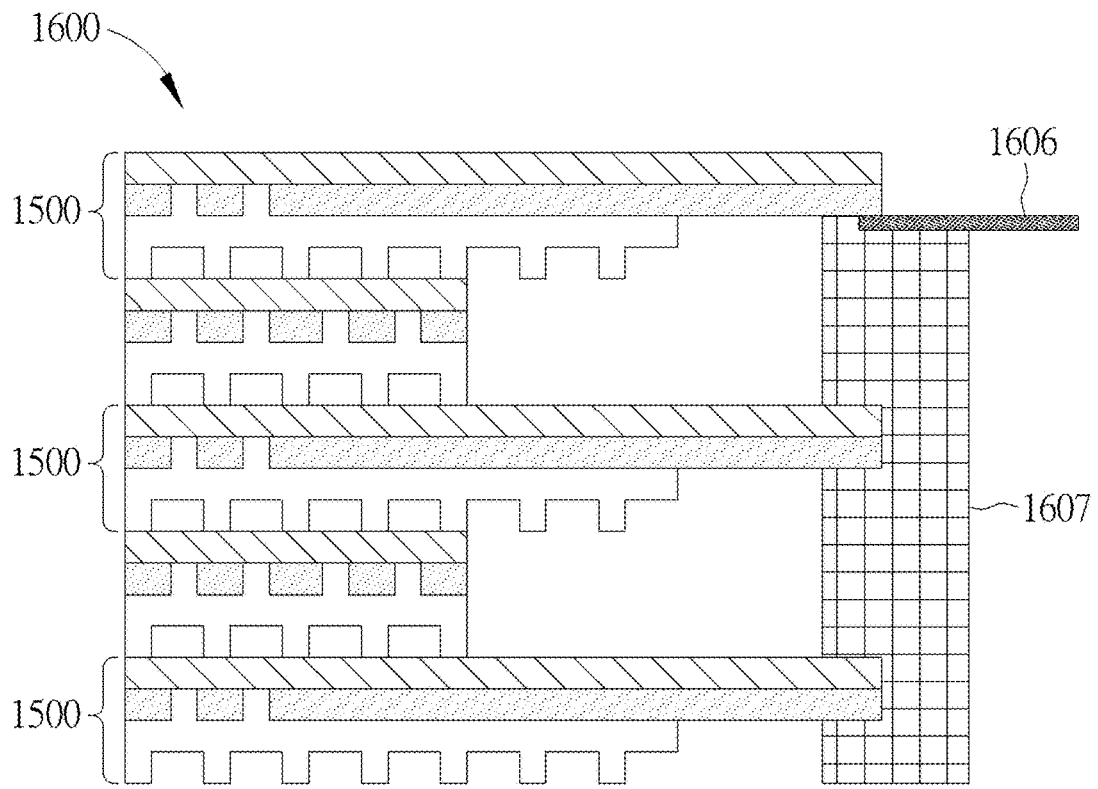
FIG. 16A is a diagram of a stacked structure according to a first embodiment of the present invention.

In order to further increase stability between the stacked layers, the present invention provides various embodiments for joining the FAE layers together to form an actuator or sensor. Refer to FIG. 16A, which is a diagram of a stacked structure 1600 according to a first exemplary embodiment. In FIG. 16A, every alternate layer is coupled at the electrical contact end 1607 to a conductive paste or adhesive, wherein a flat conductive element such as a wire 1606 is coupled to the top layer and the top of the electrical contact end 1607. Forming the stack using this method would require applying the conductive paste/adhesive to each layer before they are applied to the stack. As shown in the diagram, no deformation of any layer occurs as a result of this binding method. A large amount of conductive adhesive is required, however.

Figure 16B:
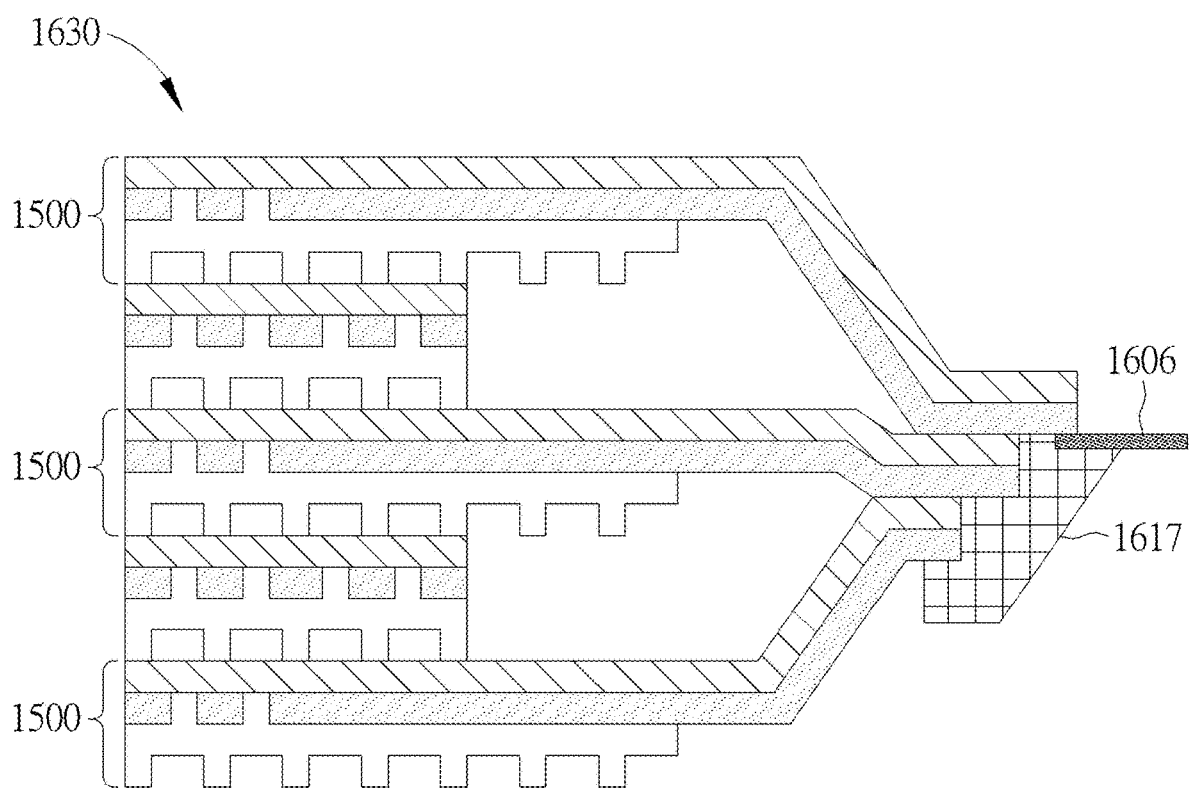
FIG. 16B is a diagram of a stacked structure according to a second embodiment of the present invention.

A second embodiment of a stacked structure 1630 is therefore illustrated in FIG. 16B. As shown in the diagram, each alternate layer has a connecting 'arm' of a different respective length. These 'arms' are bent towards each other and electrically coupled together with conductive paste or adhesive at an electrical contact end 1617. The different lengths allow less conductive paste/adhesive to be used as compared to the embodiment shown in FIG. 16A. As the conductive paste/adhesive can be applied to the underside of the connecting 'arms', as shown in the diagram, the conductive paste/adhesive can be applied after the stacked structure is formed. This method requires that each coupled FAE layer stem or arm be manufactured with a different length.

A third embodiment of a stacked structure 1650 illustrated in FIG. 16C shows coupled FAE layers all of a same length, wherein the 'arms' of each coupled FAE layer are coupled together and each coupled layer also comprises an individual flat conductive element 1670, all of which are coupled together to form the electrical connection between layers. Each individual conductive element is electrically coupled to a respective layer using a small amount of conductive paste or adhesive at an electrical contact end 1627, as illustrated in the diagram. Compared to the embodiment shown in FIG. 16A, only a small amount of conductive paste/adhesive is required, and this conductive paste/adhesive and the coupling of the flat conductive element 1670 to each individual layer can be applied before forming the stack. Complexity of production of the individual layers increases slightly, however, in comparison to the structure shown in FIG. 16A.

Figure 17A:
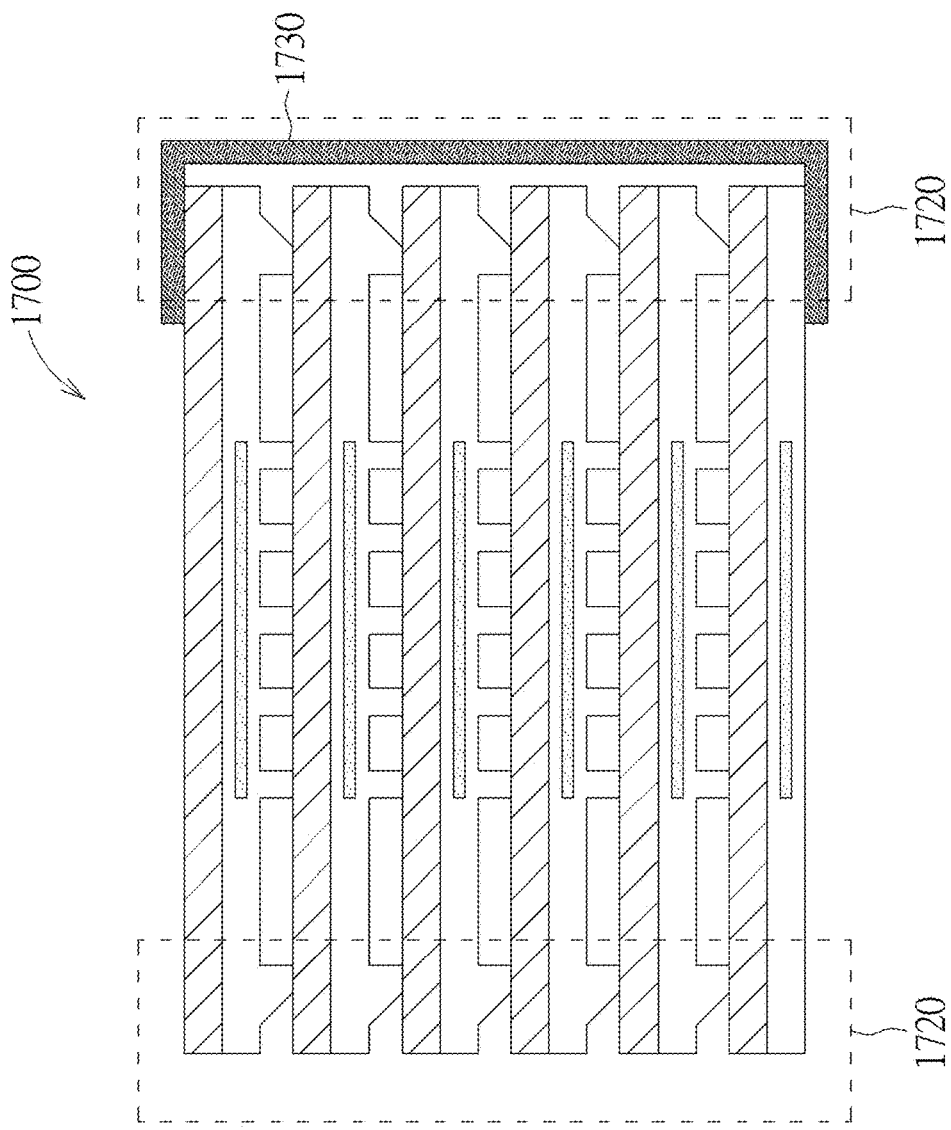
FIG. 17A is a diagram of a stacked structure with a book binding edge according to a first embodiment of the invention.
Figure 17A:
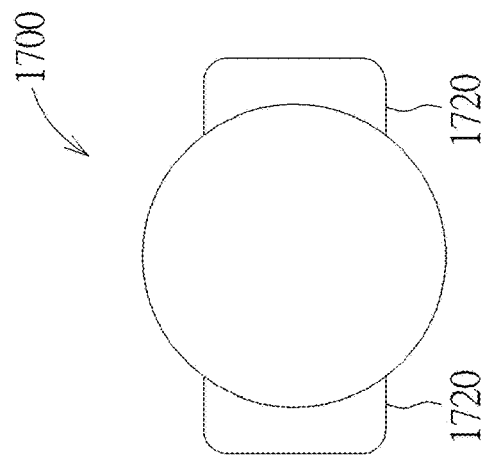

A further embodiment is proposed which simplifies the above stacking schemes while providing electrical connection between the layers. This embodiment uses a solid binding edge which has some similarity to how paperback books are bound and therefore can also be called a book binding edge, wherein an edge is formed on one or two sides of the electrode of an FAE layer and used for bonding with another FAE layer. Refer to FIG. 17A, which is a diagram of a stacked structure 1700 with a book binding edge 1720 according to a first embodiment. Similar to the elastic nodule structure between the layers, the book binding edge 1720 also has a nodule structure. By applying adhesive to the nodules and pressing the layers together, the adhesive can penetrate and form connection between the layers. As shown in the diagram, the book binding edge 1720 can be formed at both ends for increased stability. In addition, one or both of the book binding edges may further comprise a flipped film 1730 which is formed on the outside of the book binding edge for added stability.

Figure 17B:
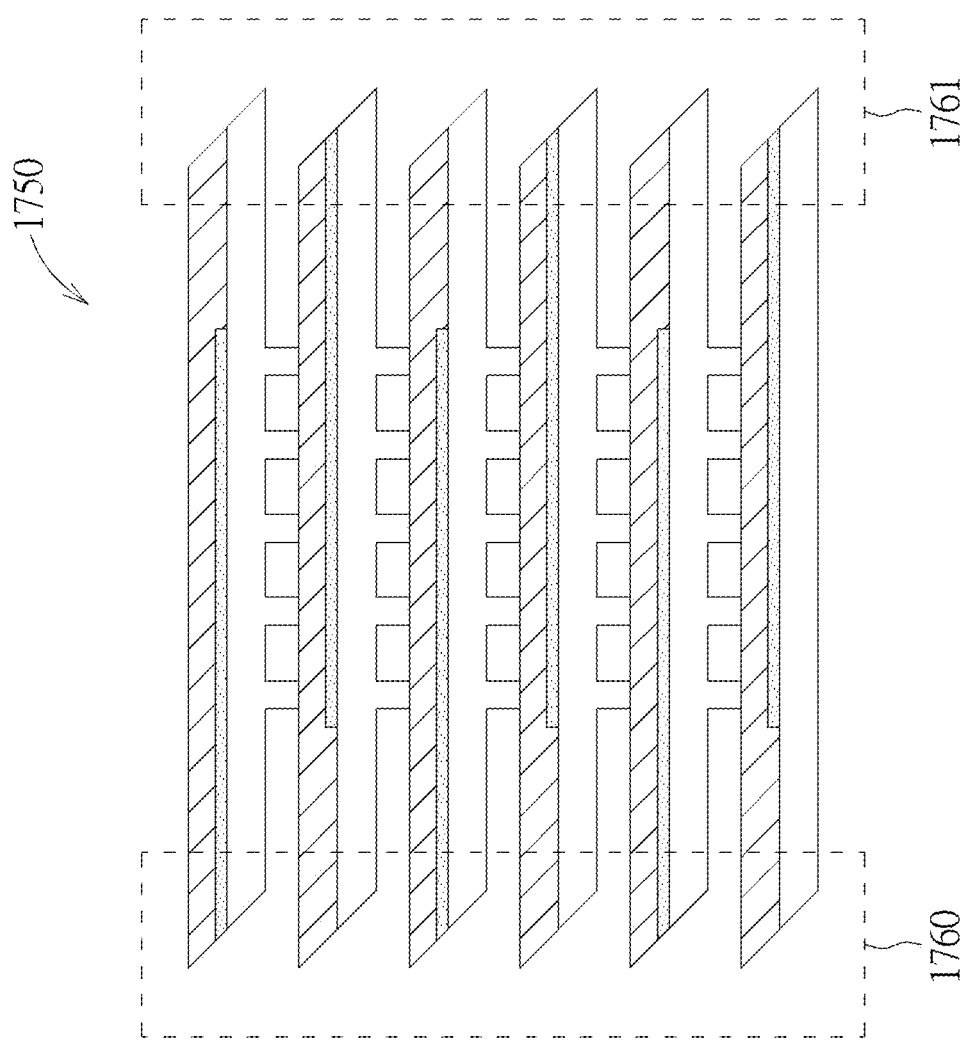
FIG. 17B is a diagram of a stacked structure with a book binding edge according to a second embodiment of the invention.
Figure 17B:
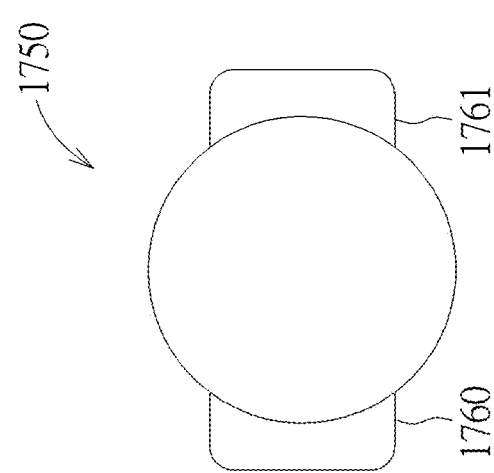

FIG. 17B is a diagram of a stacked structure 1750 with a book binding edge 1760/1761 according to a second embodiment. In this embodiment, electrical connection between the layers is achieved via the book binding edge. In this structure, the electrodes are alternately divided, such that electrodes of one polarity are coupled together at one side of the stacked structure and electrodes of the other polarity are coupled together at the other side of the stacked structure. For example, the first, third and fifth layers are coupled together at the left edge 1760 and the second, fourth and sixth layers are coupled together at the right edge 1761. Further, the electrode layers at each respective side have an exposed edge. The adhesive used to form the book binding edges at each side of the stacked structure is a conductive adhesive, such that it forms an electrical connection with the exposed electrode layers. This can further provide a single point of contact for an electrical contact such as a wire. As shown in the diagram, the electrodes at each side have a diagonal structure which exposes more of the edge, enabling a better electrical connection.

Figure 18A:
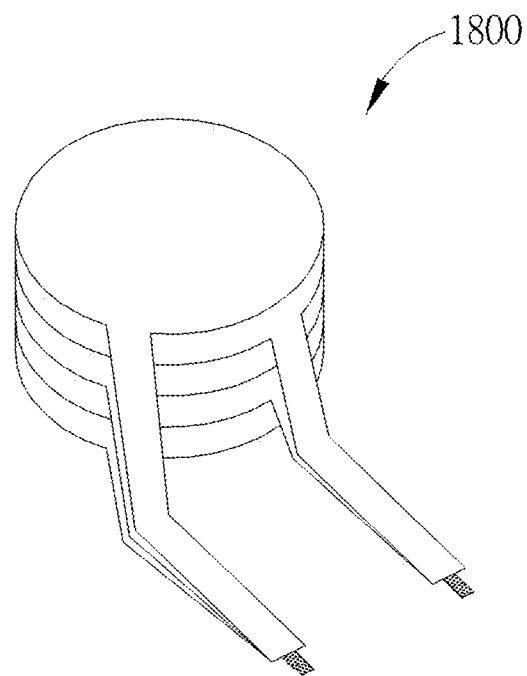
FIG. 18A is a diagram of a stacked structure.
Figure 18B:
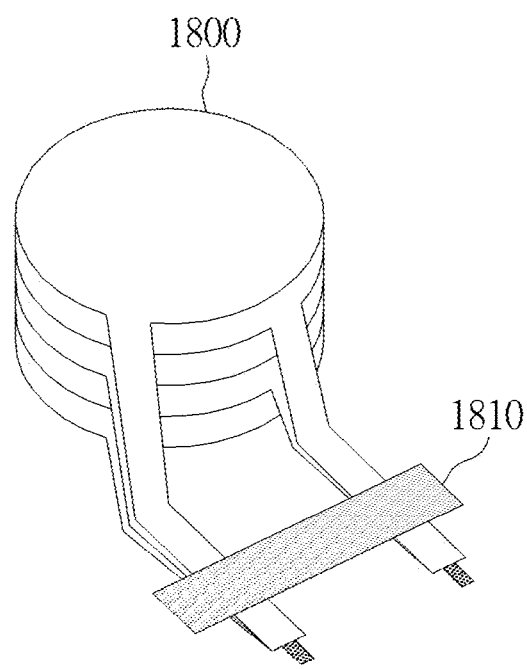
FIG. 18B is a diagram of the stacked structure illustrated in FIG. 18A with reduced lateral displacement according to a first exemplary embodiment of the present invention.

In all stacked structures, there can be a problem with too much lateral displacement occurring between the layers. In practice, it is difficult to achieve a structure that is robust but does not prevent the intended vertical movement between layers, particularly when the number of layers becomes high. The invention therefore provides a number of embodiments which provide bonding methods for stacked structures that can prevent or limit lateral displacement between the FAE layers. Refer to FIG. 18A, which is a diagram of a stacked structure 1800 comprising various FAE layers similar to that illustrated in FIG. 15A, FIG. 15B and FIG. 15C. As shown in FIG. 18A, alternate FAE layers correspond to different polarities, such that the stacked structure comprises two sets of 'arms' extending from the main stack. By fixing the arms using an adhesive method such as glue, adhesive tape or cement, or an external holding structure, the lateral displacement between the layers can be prevented. This is shown in FIG. 18B, wherein a strip of adhesive tape 1810 covers the two sets of arms of the stacked structure.

Figure 18C:
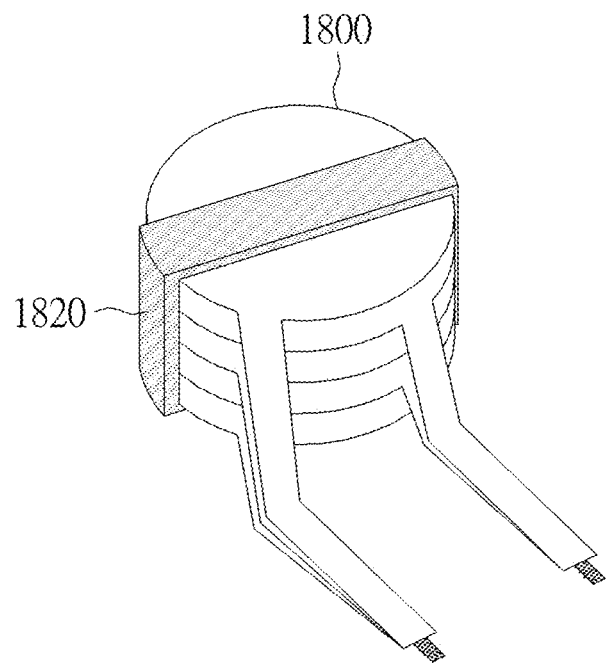
FIG. 18C is a diagram of the stacked structure illustrated in FIG. 18A with reduced lateral displacement according to a second exemplary embodiment of the present invention.
Figure 18D:
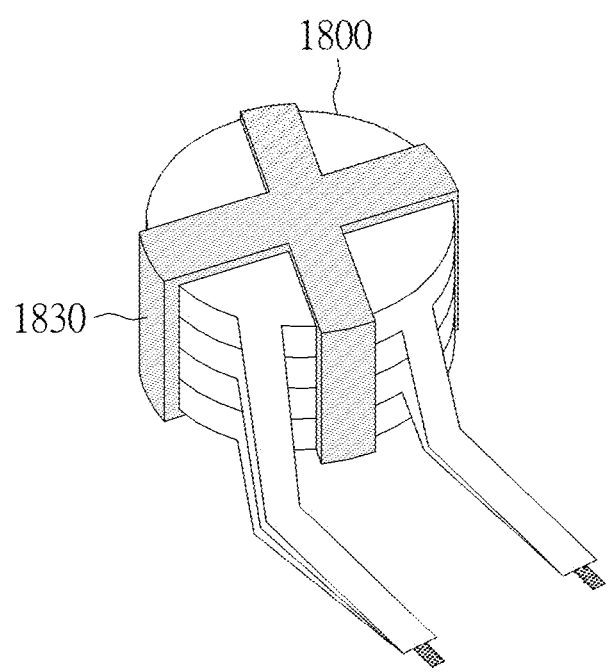
FIG. 18D is a diagram of the stacked structure illustrated in FIG. 18A with reduced lateral displacement according to a third exemplary embodiment of the present invention.
Figure 18E:
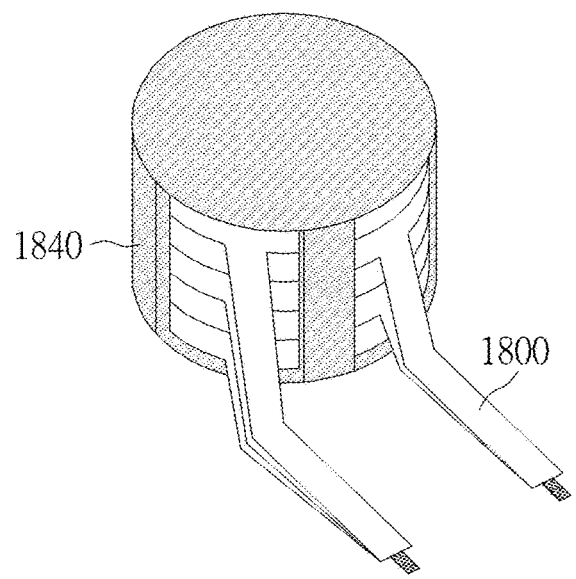
FIG. 18E is a diagram of the stacked structure illustrated in FIG. 18A with reduced lateral displacement according to a fourth exemplary embodiment of the present invention.

Rather than joining the stacked structure at the arms, the stacked structure can be joined at the main body using flexible strips which will deform (bend) when the actuator is in a compressed state. These flexible strips can be of various shapes as shown in the embodiments illustrated in FIG. 18C, FIG. 18D and FIG. 18E, illustrating flexible strips 1820, 1830 and 1840, respectively. In a modification (not shown), both the arms and the main body of the stacked structure can use flexible strips to prevent lateral displacement. In the embodiments shown in FIG. 18C, FIG. 18D and FIG. 18E, separation between layers in the vertical direction can also be prevented.

Figure 18F:
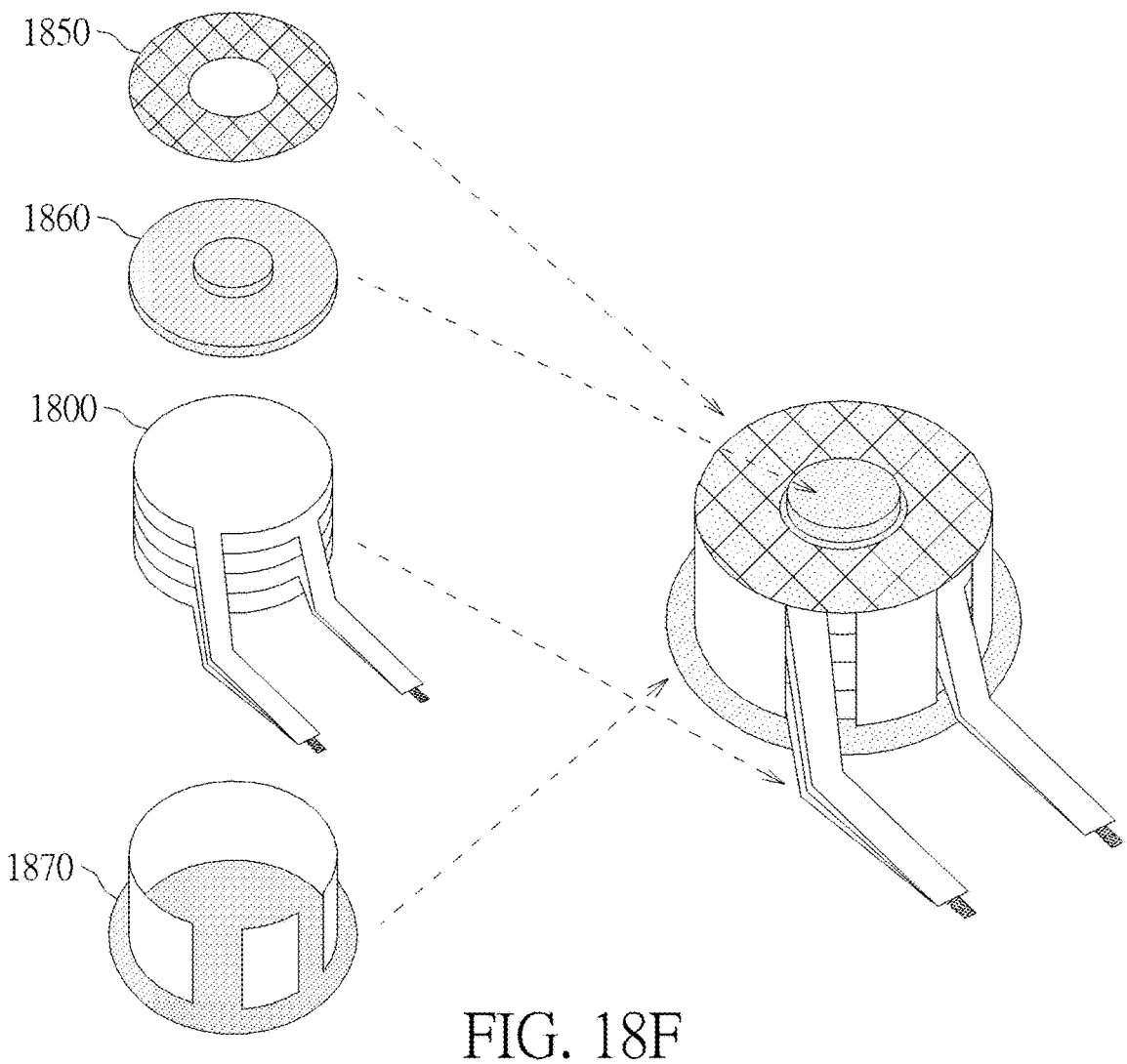
FIG. 18F is a diagram of the stacked structure illustrated in FIG. 18A with reduced lateral displacement according to a fifth exemplary embodiment of the present invention.

In yet another modification of the above structure, the entire stacked structure can be enclosed in a solid casing 1870 comprising walls that may be fully rigid or somewhat flexible, as shown in FIG. 18F. As illustrated in the diagram, the solid casing further (optionally) includes a lid 1850 which has a hollow centre that can allow access to the top of the stacked structure. The lid can optionally be attached to the solid casing to further prevent vertical displacement of the layers. In addition, a mounting structure 1860 can be applied to the stacked structure to prevent loss of functionality if the stacked structure at full compression cannot protrude through the hollow centre of the lid 1850. Please note that this solid casing can be implemented separately or in combination with the embodiments shown in FIG. 18B, FIG. 18C, FIG. 18D and FIG. 18E.

Figure 19A:
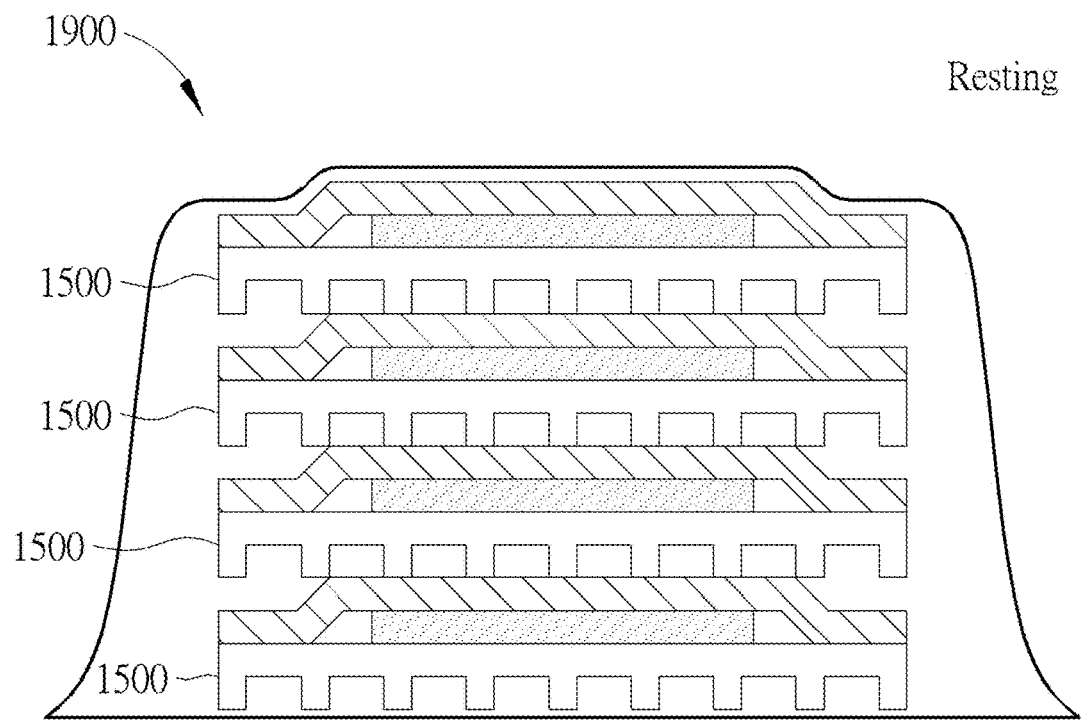
FIG. 19A is a diagram of a stacked structure according to a first exemplary embodiment.
Figure 19B:
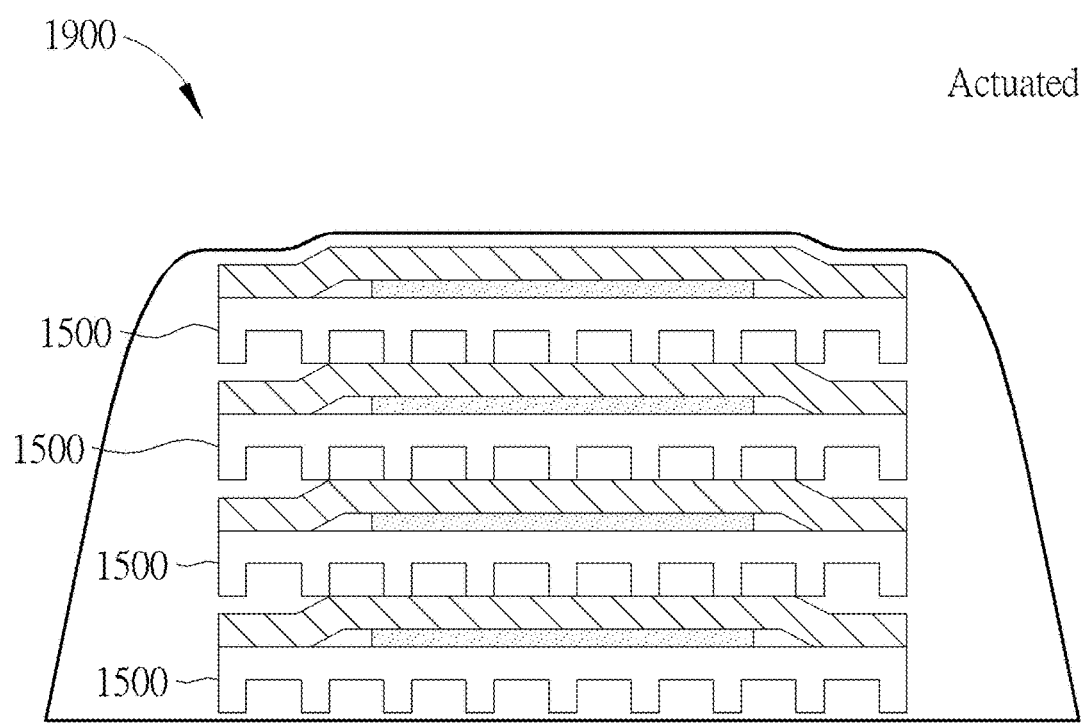
FIG. 19B is a diagram of a stacked structure according to a second exemplary embodiment.

In a final embodiment, which can also be implemented in combination with the embodiments shown in FIG. 18B, FIG. 18C, FIG. 18D and FIG. 18E, the entire stacked structure can be disposed in a flexible hermetically sealed or semi-sealed pouch 1900 as illustrated in FIG. 19A and FIG. 19B. The flexibility of the pouch allows the compression of the actuator/sensor, while the hermetic sealing prevents accumulation of dust within the stacked structure, and further controls humidity.

Semi-sealed refers to a structure that is essentially sealed but wherein the internal compartment may in some situations (such as notable pressure differences) slowly move towards ambient pressure. The pouch may protect the stack from external contamination or humidity accumulation. The shape of the pouch can be designed so that it is in close contact with the external surface of the stack when in a resting state, and that it deforms minimally to accommodate the air displaced when the stack is compressed or when variations in temperature or pressure induce expansion of the inner air. Importantly, the semi-sealed structure does not notably hinder the compression or expansion of the stack.

As the driving signal is known, and the change in capacitance and the current drawn by the actuator can be monitored, it is possible to estimate the overall compression of the actuator. Furthermore, capacitance of the system can be monitored without a driving signal that would notably compress the system. In this case, changes in the system capacitance indicate compression of the system by external forces. Capacitance changes can also be monitored via various other signal proxies such as voltage changes, current draw changes or changes in oscillator frequencies in the system. These techniques are examples of methods enabling the sensor application of the stacked structures.

The system may also be divided into subsystems, with each subsystem having its own monitoring circuitry. This allows for more localized monitoring of the physical changes in the system. The configuration of the electrode layers makes the capacitance of the stack very sensitive to small stack compressions. Therefore, functionality for compression sensing can be achieved by the constant monitoring of the capacitance of the stack.

FIG. 19A presents a profile view of a stack contained in a flexible hermetically sealed pouch 1900. FIG. 19B illustrates the deformation of the pouch 1900 under compression whereby a same volume leads to a different pouch external shape to accommodate approximately the same fluid/air volume. The pouch 1900 can also accommodate changes in external air pressure due to its structure, providing minimal hindrance to the compression decompression cycles of the actuator or sensor.

Figure 19C:
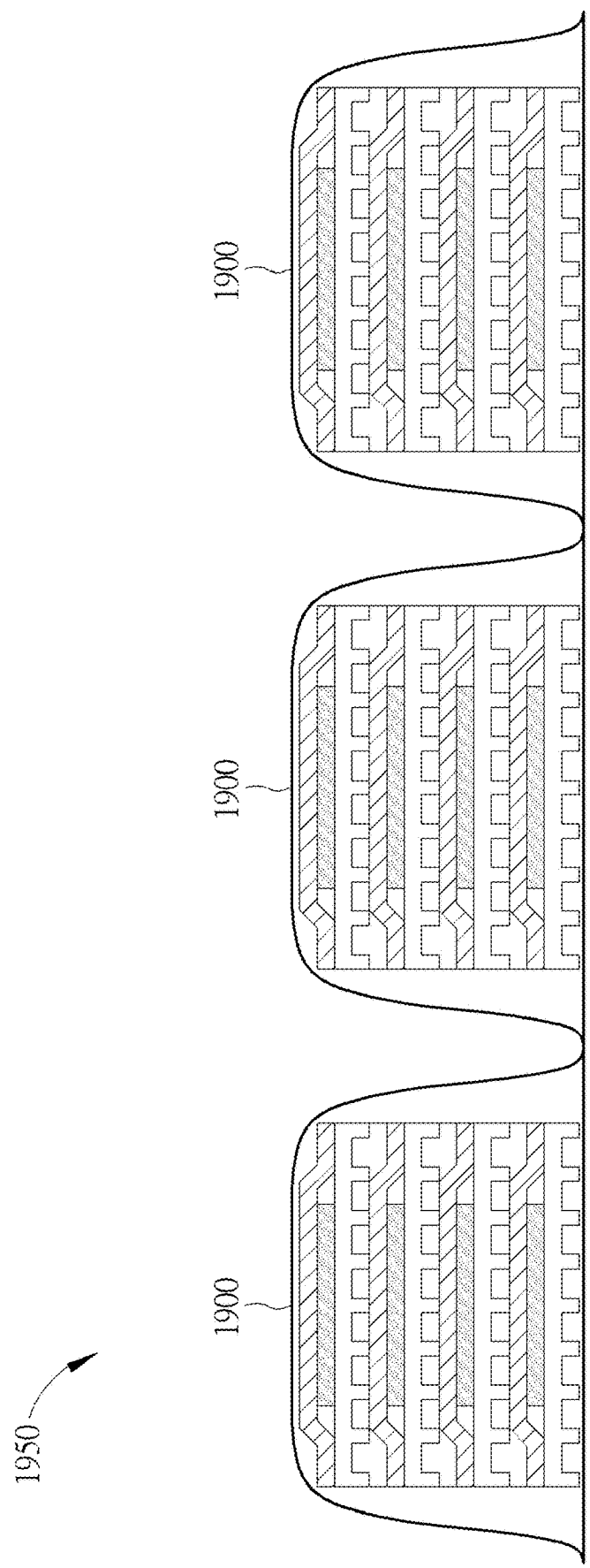
FIG. 19C is a diagram of an array of stacked structures as illustrated in FIG. 19A according to an embodiment.
Figure 19D:
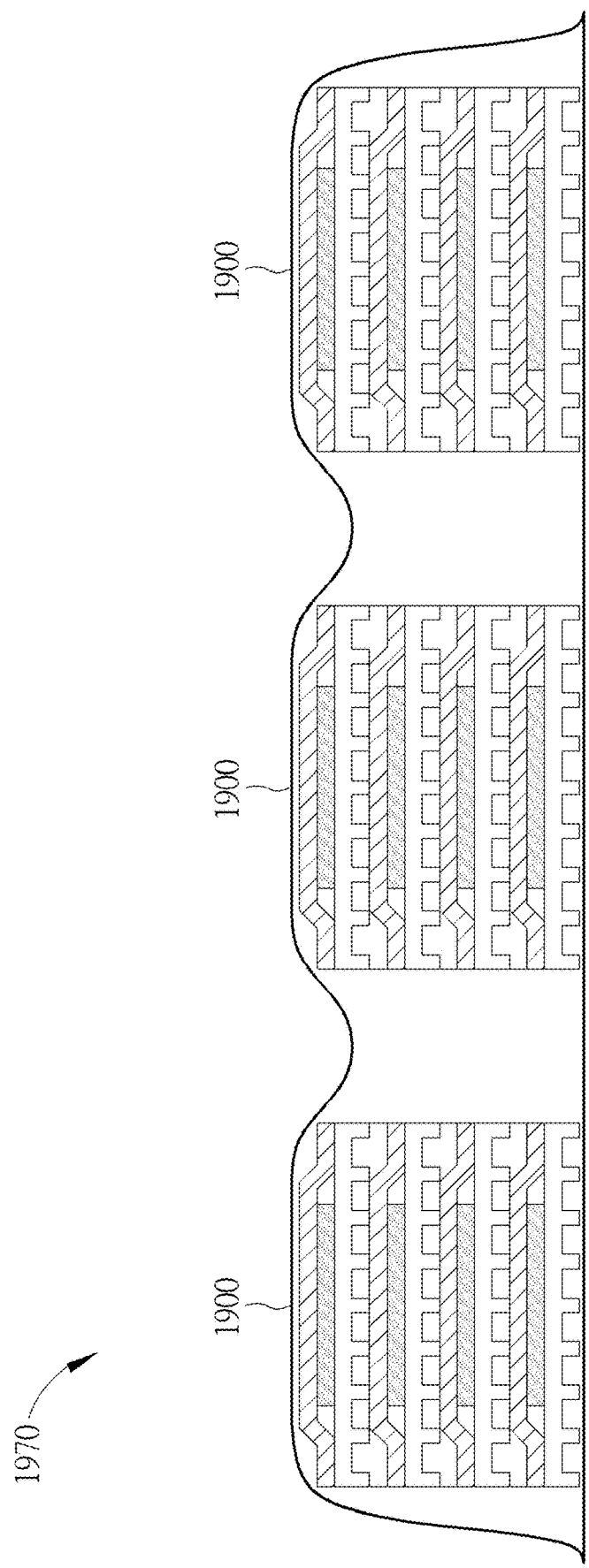
FIG. 19D is a diagram of an array of stacked structures as illustrated in FIG. 19A according to another embodiment.

FIGS. 19C and 19D represent two examples for the use of flexible hermetically sealed pouches in arrays of stacked actuators. FIG. 19C illustrates an array 1950, wherein parts of the pouch reach the base supporting surface between the different stacked actuators. In an embodiment, they may be adhered to the base supporting surface in order to provide increased robustness and to prevent possible local damage in some part of the pouch that could affect the whole array of actuators. In this form, the deformation of the pouch upon compression occurs laterally. FIG. 19D illustrates a simpler example of a pouched array 1970, which is easier to produce and where the deformation of the pouch occurs vertically in the regions between the stacks.

The invention provides a number of stacked structures which have good isolation between the layers. Holding structures such as binding edges or strip layers can increase the robustness by preventing lateral displacement of the layers in the stacked structure with respect to each other wherein the vertical movement of their active regions is not hindered.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An active element (AE) layer comprising:
   a substrate comprising an active body area and a protruding arm;
   an electrode, formed on the substrate and comprising an active region for sensing or actuation formed on the active body area of the substrate and a connection region formed on the protruding arm of the substrate, wherein the electrode comprises a first indented line around the periphery of the active region, extending into the connection region and reaching two respective edges of the connection region, wherein the first indented line totally penetrates the electrode to make the respective edges electrically isolated; and
   an insulator layer formed on the electrode covering the active region and partially covering the connection region, wherein the insulator layer fills the indented line of the electrode.

2. The AE layer of claim 1, further comprising second indented lines comprising one or more indented line, the second indented lines formed within the first indented line and formed around the periphery of the active region, extending into the connection region and reaching the two respective edges of the connection region beyond the first etched line, wherein the second indented lines totally penetrate the electrode to make the respective edges electrically isolated.

3. The AE layer of claim 2, wherein at least one of the first indented line and the second indented lines partially penetrates the substrate.

4. The AE layer of claim 1, wherein the insulator layer is an elastic layer.

5. The AE layer of claim 1, being part of a sensor.

6. The AE layer of claim 1, being part of an actuator.

* * * * *